United States Patent
Liu et al.

(10) Patent No.: US 12,412,925 B1
(45) Date of Patent: *Sep. 9, 2025

(54) METHODS FOR IMPROVING CRITICAL CURRENT DENSITY IN A SULFIDE-BASED ALL-SOLID-STATE LITHIUM-ION BATTERY

(71) Applicants: LG ENERGY SOLUTION, LTD., Seoul (KR); THE REGENTS OF THE UNIVERSITY OF CALIFORNIA, Oakland, CA (US)

(72) Inventors: Ping Liu, San Diego, CA (US); Ke Zhou, San Diego, CA (US); Mengchen Liu, San Diego, CA (US); Jeong Woo Oh, San Diego, CA (US); Min-Sang Song, Daejeon (KR)

(73) Assignees: LG ENERGY SOLUTION, LTD., Seoul (KR); THE REGENTS OF THE UNIVERISTY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/946,564

(22) Filed: Nov. 13, 2024

Related U.S. Application Data

(63) Continuation-in-part of application No. 18/650,734, filed on Apr. 30, 2024, now Pat. No. 12,148,880.

(51) Int. Cl.
*H01M 10/056* (2010.01)
*H01M 4/38* (2006.01)

(52) U.S. Cl.
CPC ......... *H01M 10/056* (2013.01); *H01M 4/382* (2013.01); *H01M 2220/20* (2013.01);
(Continued)

(58) Field of Classification Search
None
See application file for complete search history.

(56) References Cited

U.S. PATENT DOCUMENTS

| 2006/0209496 | A1 | 9/2006 | Takatani et al. |
| 2010/0330425 | A1 | 12/2010 | Lopatin et al. |

(Continued)

FOREIGN PATENT DOCUMENTS

| KR | 10-2012-0050983 A | 5/2012 |
| KR | 10-2018-0096983 A | 8/2018 |

(Continued)

OTHER PUBLICATIONS

Bagheri et al., "Functionalized Metallic 2D Transition Metal Dichalcogenide-Based Solid-State Electrolyte for Flexible All-Solid-State Supercapacitors," ACS Nano, vol. 16, 2022, pp. 16426-16442.

(Continued)

*Primary Examiner* — Nathanael T Zemui
(74) *Attorney, Agent, or Firm* — Birch, Stewart, Kolasch & Birch, LLP

(57) ABSTRACT

Solid electrolyte compositions and solid-state batteries are disclosed, which comprise a solid electrolyte layer including a sulfide-containing solid-state electrolyte material and a compound of Chemical Formula 1. The sulfide-containing solid-state electrolyte material includes but is not limited to $Li_6PS_5Cl$ ("LPSC"), an LPS-based glass or glass ceramic of formula $xLi_2S \cdot yP_2S_5$, wherein $x+y=1$, or an argyrodite-based sulfide-based solid electrolyte or formula $Li_6PS_5X$, wherein $X=Cl$, Br, or I) or $Li_{6-y}PS_{5-y}Cl_{1+y}$, where y is <1. In some aspects, the compound of Chemical Formula 1 is sodium 3-mercapto-1-propanesulfonate (3M1P).

20 Claims, 16 Drawing Sheets

(52) U.S. Cl.
CPC ............... *H01M 2300/008* (2013.01); *H01M 2300/0082* (2013.01); *H01M 2300/0094* (2013.01)

(56) References Cited

U.S. PATENT DOCUMENTS

| | | |
|---|---|---|
| 2018/0241042 A1 | 8/2018 | Cho et al. |
| 2022/0416235 A1 | 12/2022 | Kim et al. |
| 2023/0127602 A1 | 4/2023 | Lee et al. |
| 2023/0253612 A1* | 8/2023 | Cho ............... H01M 10/0562 429/322 |

FOREIGN PATENT DOCUMENTS

| | | |
|---|---|---|
| KR | 10-2022-0053825 A | 5/2022 |
| KR | 10-2023-0001509 A | 1/2023 |
| KR | 10-2023-0024284 A | 2/2023 |
| KR | 10-2024-0028954 A | 3/2024 |

OTHER PUBLICATIONS

Kim et al., "Designing solid-electrolyte interphases for lithium sulfur electrodes using ionic shields," Nano Energy, vol. 41, 2017, pp. 573-582.

\* cited by examiner (g)

(h)

METHODS FOR IMPROVING CRITICAL CURRENT DENSITY IN A SULFIDE-BASED ALL-SOLID-STATE LITHIUM-ION BATTERY

CROSS-REFERENCE TO RELATED APPLICATIONS

This application is a Continuation-in-Part of application Ser. No. 18/650,734, filed Apr. 30, 2024. The entire contents of the prior application are hereby incorporated by reference in their entirety.

FIELD OF TECHNOLOGY

The present disclosure relates to solid electrolyte compositions and a solid-state battery thereof, which have improved critical current density and reduced operating pressure. In some aspects, an additive, such as a thiol (e.g., sodium 3-mercapto-1-propanesulfonate (3M1P)), a hydroseleno, an alkyl silane, or an alkyl halide, is used in a sulfide-based all-solid-state electrolyte.

BACKGROUND

There continues to be an increase in electrified transportation, exemplified by the widespread adoption of electric vehicles (EVs) and the emergence of urban air mobility (UAM) vehicles. Simultaneously, there is a growing demand for stationary energy storage systems, notably in the residential and industrial sectors, powered by solar and wind generators. This shift is driven in part by the pressing need to mitigate the adverse environmental and climate impacts associated with traditional internal combustion engines and other non-renewable means of power generation. Thus, the development of battery technologies with high energy density, while also ensuring enhanced safety, has become an imperative.

Conventional liquid lithium-ion batteries were critical to the advancement of electrified transportation and energy storage systems, and have had a significant and positive impact on green energy and climate change mitigation efforts. While such conventional liquid lithium-ion batteries are superior to many other energy sources, liquid lithium-ion batteries also have certain limitations. For example, various safety mechanisms are critical for lithium-ion batteries to restrict voltage and internal pressures, but these safety features typically result in increased weight and performance limitations in certain instances. Moreover, lithium-ion batteries are susceptible to aging, leading to capacity loss and eventually failure after a number of years of use.

In the pursuit of achieving a net-zero emission society, recent efforts have focused on solid-state batteries, which offer higher energy density (e.g., >500 Wh $kg^{-1}$) and are safer than batteries with a liquid electrolyte system, such as conventional lithium-ion batteries. In a conventional solid-state battery, a solid electrolyte replaces a liquid electrolyte system, and thus reduces the risk of ignition or explosion, thereby increasing safety. However, the unstable interface between lithium metal and the electrolyte is a challenge. A potential disadvantage of solid electrolytes is the loss of Li ion transfer path due to cracks and voids that inevitably occur during charging and discharging processes, and which can eventually result in the failure of ion transfer. The formation of interfacial voids, delamination, dendrite, and heterogeneous solid-electrolyte interphase (SEI) in the cell at the modest stack pressure of 2 MPa are possible issues, which can lead to rapid battery failure. Accordingly, a significant issue for an all-solid-state lithium (Li) metal battery (also referred to as "ASSLMB") is the unstable interfacial challenges between a solid-state electrolyte (also referred to as "SSE") and Li metal, giving rise to Li dendrite formation and gap development, ultimately leading to short circuits and cell fail, among other issues.

Thus, there exists a need for a solid electrolyte for an all-solid-state battery, which has high ionic conductivity, thermal stability, and interfacial compatibility compared to existing solid electrolytes. Moreover, there remains a need for solid-state batteries that have improved critical current density and reduced operating pressure.

DISCLOSURE

Technical Problem

The present disclosure relates to methods for improving critical current density and reducing operating pressure in a battery (e.g., such as a sulfide all-solid-state lithium-ion battery), as well as solid-state batteries and solid electrolyte materials which comprise a compound of Chemical Formula 1 as an additive to a solid electrolyte material.

Technical Solution

The present disclosure relates to the use of a compound of Chemical Formula 1 as an additive to a solid electrolyte material, as well as a solid-state battery thereof. In certain aspects, the resulting solid electrolyte material can transfer lithium ions into a solid-state electrolyte, e.g., to provide percolated lithium ion conducting channels. Thus, in certain aspects, the lithium ion conducting channels facilitate contact between the solid-state electrolyte and the lithium metal.

In some aspects, an additive (e.g., including but not limited to a thiol (e.g., sodium 3-mercapto-1-propanesulfonate (3M1P)), a hydroseleno, an alkyl silane, or an alkyl halide), which has good lithium ion conductivity, can be used to conduct lithium ions together with the sulfide all-solid-state electrolyte. For example, the modified sulfide all-solid-state electrolyte can have intimate contact with lithium metal, so that the sulfide all-solid-state battery with low pressure can cycle well, under conditions of low pressure.

Some aspects relate to modifying the surface of a sulfide all-solid-state electrolyte such as $Li_6PS_5Cl$ (LPSCl) with sodium 3-mercapto-1-propanesulfonate (3M1P) to achieve a composite sulfide electrolyte ("LPSC1@3M1P"), which is used to in-situ construct the interface molecular layer with Li metal. Electrochemical and surface analysis have established that the side reaction between Li and the electrolyte can be significantly mitigated, significantly improving the compatibility between them without affecting $Li^+$ diffusion. More importantly, the stable Li/electrolyte interface enables the deposition of hexagonally shaped Li crystals, terminated by its 110 surfaces. The Li crystals may be oriented with their (0001) facet parallel to the substrate. This faceted crystal growth leads to a dense, low-porosity Li layer with a smooth interface with the electrolyte layer, assuring the ultimate contact between electrolyte and Li metal. Consequently, in a Li|LPSCl@3M1P|NCM811 pellet cell and pouch cell, both can undergo stable cycling for 100 cycles with a high-capacity retention of 85%. Thus, surface molecular engineering can effectively suppress the parasitic reaction between Li and electrolyte, transforming the growth behavior of Li in ASSLMBs, and opening the door to long-life batteries in industrial production. Some other aspects relate to modifying the surface of a sulfide solid-state electrolyte such as LPSCl with 3-chloro-1-propanesulfonic acid (3C1P) to achieve a composite sulfide electrolyte ("LPSCl@3C1P"), which are used to in-situ construct the interface molecular layer with Li metal. Electrochemical and surface analysis have established that the side reaction between Li and the electrolyte can be significantly mitigated, significantly improving the compatibility between them without affecting Li$^+$ diffusion. More importantly, the stable Li/electrolyte interface enables the deposition of hexagonally shaped Li crystals, terminated by its 0001 surfaces. The Li crystals may be oriented with their (0001) facet parallel to the substrate. This faceted crystal growth leads to a dense, low-porosity Li layer with a smooth interface with the electrolyte layer, assuring the ultimate contact between electrolyte and Li metal. Consequently, in a Li|LPSCl@3C1P|NCM811 pellet cell and pouch cell, both can undergo stable cycling with a high-capacity retention. The LPSCl also exhibits enhanced moisture stability due to the stronger bonding of alkyl halide to LPSCl than that of water molecules. Thus, surface molecular engineering can effectively suppress the parasitic reaction between Li and electrolyte, transforming the growth behavior of Li in ASSLMBs, and opening the door to long-life batteries in industrial production.

In some aspects, the critical current density increases from 0.6 mA to 4 mA, for example, which helps to increase the capacity of the battery. According to the present disclosure, there is a large improvement compared to existing technology.

The sulfide all-solid-state batteries according to the present disclosure can be charged and discharged under low pressure, e.g., manual battery installation instead of requiring a torque wrench.

Advantageous Effects

According to the present disclosure, the critical current density is increased, and the operating pressure is reduced using a compound of Chemical Formula 1 as an additive to a solid electrolyte material. Additionally, the present disclosure is further directed to providing a solid-state battery having good electrical and chemical properties including safety, heat resistant stability, energy density, life characteristics and Coulombic efficiency. It will be readily appreciated that these and other objects and advantages of the present disclosure may be realized by means or methods described in the appended claims and a combination thereof.

In an aspect, the critical current density ("CCD") is the highest current density before dendrites grow to produce a short circuit. For instance, the maximum endurable current density of lithium battery cycling without cell failure in ASSLMBs is generally defined as critical current density (CCD). Currently, it is generally accepted that the CCD can be measured using a symmetric Li/electrolytes/Li cell configuration at gradually increasing current densities. The current density at which a sharp potential drop occurs is considered equal to the CCD that is the current density at which Li dendrite propagation begins. According to the disclosure, a CCD of greater than about 4 mA cm$^{-2}$ is provided, e.g., the CCD can be greater than about 5 mA cm$^{-2}$, greater than about 6 mA cm$^{-2}$, greater than about 7 mA cm$^{-2}$, greater than about 8 mA cm$^{-2}$, greater than about 9 mA cm$^{-2}$, greater than about 10 mA cm$^{-2}$, greater than about 11 mA cm$^{-2}$, greater than about 12 mA cm$^{-2}$, greater than about 13 mA cm$^{-2}$, greater than about 14 mA cm$^{-2}$, or greater than about 15 mA cm$^{-2}$.

One aspect relates to a solid electrolyte composition comprising: a sulfide-containing solid electrolyte material, having a surface; and an organic coating, wherein the organic coating is formed on the surface of the sulfide-containing solid-state electrolyte material, and wherein the coating is formed from at least one compound of Chemical Formula 1 and the sulfide-containing solid-state electrolyte material:

Chemical Formula 1 wherein:
A is a halogen, SH, or a leaving group;
R is a substituted or unsubstituted C3-C20 alkylene group; and
W is a sulfonate, a phosphonate, or a salt thereof.

In some aspects, in the solid electrolyte composition, the compound of Chemical Formula 1 is attached to the surface of the sulfide-containing solid-state electrolyte material by chemisorption, van der Waals interaction, or ionic interaction. Alternatively, the compound of Chemical Formula 1 reacts with the sulfide-containing solid-state electrolyte material to form a covalent bond.

In other aspects, in the compound of Chemical Formula 1, A is a halogen. A may be a SH group. In some aspects, A is fluoride, chloride, bromide, or iodide. In some aspects, in the compound of Chemical Formula 1, A is a leaving group selected from a triethoxysilyl or a trimethoxysilyl. In some aspects, in the compound of Chemical Formula 1, R is a C6-C16 alkyl group, and R is a C8-C12 alkyl group. In some aspects, the compound of Chemical Formula 1 has a total of 6 to 16 carbons. In some aspects, the compound of Chemical Formula 1 has a total of 8 to 12 carbons. In some aspects, in the compound of Chemical Formula 1, at least one of R is a substituted C3-C20 alkyl group, wherein there are one or more substituents selected from fluorine, chlorine, bromine, ester or ketone moieties.

In some aspects, the compound of Chemical Formula 1 is sodium 3-mercapto-1-propanesulfonate (3M1P):

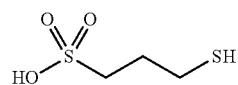

In some aspects, the compound of Chemical Formula 1 is 3-chloro-1-propanesulfonic acid (3C1P) (or a salt thereof):

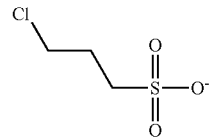

According to the disclosure, the sulfide-containing solid electrolyte material can be selected from the group consisting of an inorganic-based electrolyte material and an organic-based electrolyte material. In some aspects, the sulfide-containing solid-state electrolyte material is an inorganic electrolyte. For instance, the sulfide-containing solid electrolyte can comprise at least one selected from Li$_3$P$_7$S$_{11}$, Li$_{10}$GeP$_2$Si$_2$, and Na$_3$PS$_4$ and/or Li$_6$PS$_5$Cl. Also, in some aspects, the sulfide-containing solid electrolyte comprises at least one selected from LPS-based glass or glass ceramic of formula xLi$_2$S·yP$_2$S$_5$, wherein x+y=1. In some aspects, the sulfide-containing solid electrolyte comprises an argyrodite-based solid electrolyte of formula $Li_6PS_5X$, wherein X is Cl, Br, or I. In some aspects, the sulfide-containing solid electrolyte comprises an argyrodite-based solid electrolyte of formula $Li_{6-y}PS_{5-y}Cl_{1+y}$, where y is <1.

According to some aspects, a method is provided for making a solid electrolyte composition, comprising: providing a sulfide-containing solid electrolyte material; and reacting the solid electrolyte material with at least one compound of Chemical Formula 1 to form a coated sulfide-containing solid electrolyte material:

A—R—W                                     Chemical Formula 1 wherein:
A is a halogen, —SH group, a —SeH group, or a leaving group;
R is a substituted or unsubstituted C3-C20 alkylene group; and
W is a sulfonate, a phosphonate, or a salt thereof.

According to some aspects, a method is provided for making a solid electrolyte, comprising: providing a sulfide-containing solid electrolyte material; reacting the solid electrolyte material with at least one compound of Chemical Formula 1 to form a coated sulfide-containing solid electrolyte material; and using the coated sulfide-containing solid electrolyte material to form a solid electrolyte:

A—R—W                                     Chemical Formula 1 wherein:
A is a halogen, —SH group, a —SeH group, or a leaving group;
R is a substituted or unsubstituted C3-C20 alkylene group; and
W is a sulfonate, a phosphonate, or a salt thereof.

Some aspects relate to a solid electrolyte comprising the coated sulfide-containing solid electrolyte material.

Some aspects relate to an all-solid-state battery comprising a negative electrode, a positive electrode; and the solid electrolyte as described herein, wherein the solid electrolyte is interposed between the negative electrode and the positive electrode. The sulfide-containing solid electrolyte material may have a surface in contact with the solid electrolyte interface.

In some aspects, a solid electrolyte interface (SEI) layer may be between the negative electrode and the solid electrolyte, and the SEI layer may comprise lithium crystals in a hexagonal close-packed (HCP) structure. The lithium crystals may be oriented with their (0001) facet parallel to the substrate.

BRIEF DESCRIPTION OF THE DRAWINGS

The accompanying drawings illustrate aspects of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

FIG. 1A shows a schematic illustration of lithium deposition for an electrolyte comprising LPSCl, FIG. 1B shows a schematic illustration of lithium deposition for an electrolyte comprising LPSCl and 3M1P, and FIG. 1C shows a schematic illustration of lithium deposition for an electrolyte comprising LPSCl and 3C1P. As discussed above, a significant issue for ASSLMBs is the unstable interfacial challenges between SSEs and Li metal, e.g., giving rise to Li dendrite formation and gap development, ultimately leading to short circuits and battery cell failure (FIG. 1A). For instance, delamination is caused by the deterioration of the interface and heterogenous $Li^+$ flux for the $Li_6PS_5Cl$ electrolyte without the surface treatment (FIG. 1A). Another problem is the urgent need for low stack pressure operation of ASSLMBs in industrial production. As described in certain aspects herein, surface molecular engineering is used to encapsulate a compound of sodium 3-mercapto-1-propanesulfonate (3M1P) or 3-chloro-1-propanesulfonic acid (3C1P) onto a $Li_6PS_5Cl$ electrolyte using a simple ball-milling method. Interestingly, this process creates a compatible interface of electrolyte with Li metal and prompts the faceted Li crystal growth during plating at a modest stack pressure of 2 MPa (FIGS. 1B and 1C), which helps inhibit interfacial voids formation and Li dendritic growth, ultimately allowing homogeneous $Li^+$ flux, and improves battery function. The LPSCl@3M1P and LPSCl@3C1P electrolytes improve the compatibility of SSE and the Li metal anode, and helps make lithium metal batteries more practical.

FIG. 2A shows adsorption configurations, adsorption energy for Li and Li@3M1P. FIG. 2B shows the radial distribution function shows the distribution of the distances between the O/S atoms and the Li atoms during the timeframe of AIMD. FIG. 2C shows the probability distribution of in-plane (b) and out-of-plane (c) displacement of Li atoms in Li and Li@3M1P. O 2s (FIG. 2D) and S 2p XPS (FIG. 2E) plot for 3M1P, Li, and Li@3M1P|Li. FIG. 2F shows schematic diagram of in-situ construction of the surface molecular layer between LPSCl@3M1P electrolyte pellet and Li metal foil.

FIG. 3A shows the critical current density (CCD) CCD testing of symmetric Li|LPSCl|Li and Li|LPSCl@3M1P|Li cells stacked with pressure of 2 MPa at 25° C. FIG. 3B shows cycling performance of symmetric Li|LPSCl|Li and Li|LPSCl@3M1P|Li cells with various current rates at 2 MPa and 25° C. FIG. 3C shows the first and fifth cyclic voltammetry curves of Li|LPSCl|Li and Li|LPSCl@3M1P|Li at a sweeping rate of 0.5 mV s−1. FIG. 3D shows the S 2p XPS plot for the surface of Li|LPSCl|Li and Li|LPSCl@3M1P|Li after 100 cycles. FIG. 3E shows the Nyquist plot evolution of Li|LPSCl|Li and Li|LPSCl@3M1P|Li during stripping/plating in symmetric cells. FIG. 3F shows the TOF-SIMS secondary ion images of Li|LPSCl|Li and Li|LPSCl@3M1P|Li after 100 cycles with the 3D view images.

DETAILED DESCRIPTION

Figure 1A:
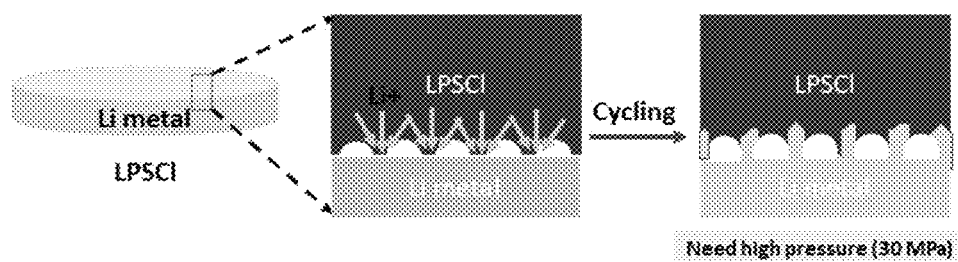
FIGS. 1A, 1B, and 1C show a schematic diagram of the interface evolution between electrolyte and Li metal of LPSCl (FIG. 1A), an electrolyte comprising LPSCl that has been surface treated with 3M1P ("LPSCl@3M1P") (FIG. 1i), and an electrolyte comprising LPSCl that has been surface treated with 3C1P ("LPSCl@3C1P") (FIG. 1C) electrolytes during cycling. Specifically.

Hereinafter, the present disclosure will be described in detail. It should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the aspects of the disclosure described herein and the elements shown in the drawings are just aspects of the present disclosure, but not intended to fully describe the technical aspects of the present disclosure, so it should be understood that other equivalents and modifications could have been made thereto at the time the application was filed. Unless defined otherwise, all the technical and scientific terms used herein have the same meanings as commonly known by a person skilled in the art. In the case that there is a plurality of definitions for the terms herein, the definitions provided herein will prevail.

Unless specified otherwise, all the percentages, portions and ratios in the present disclosure are on weight basis.

Unless indicated to the contrary, the numerical parameters set forth in the following specification and attached claims are approximations that may vary depending upon the desired properties sought to be obtained according to aspects of the disclosure. Whenever a numerical range with a lower limit and an upper limit is disclosed, any number and any included range falling within the range is specifically disclosed. Every range of values (of the form, "from about a to about b," or, equivalently, "from approximately a to b," or, equivalently, "from approximately a-b") disclosed herein is to be understood to set forth every number and range encompassed within the broader range of values.

While compositions and methods are described herein in terms of "comprising" various components or steps, the compositions and methods can also "consist essentially of" or "consist of" the various components and steps. The terms "comprise(s)" or "include(s)" when used in this specification, specifies the presence of stated elements, but does not preclude the presence or addition of one or more other elements, unless the context clearly indicates otherwise.

The terms "about" and "substantially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure. The terms "about" and "approximate", when used along with a numerical variable, generally means the value of the variable and all the values of the variable within an experimental error (e.g., 95% confidence interval for the mean) or within a specified value±10% or within a broader range. Unless otherwise indicated, all numbers expressing quantities of ingredients, properties such as molecular weight, reaction conditions, and so forth used in the present specification and associated claims are to be understood may be modified by the term "about." "A and/or B" when used in this specification, specifies "either A or B or both." To achieve stable cycling behavior in ASSLMBs, the interface between Li metal and electrolyte should be thermodynamically stable or be passivated to be kinetically stable. For instance, the interface should prevent direct contact between Li and LPSCl, for example, to avoid side reactions. Secondly, it should electronically insulate while maintaining a strong $Li^+$ affinity. Third, it should be chemically and electrochemically stable with Li and induce homogeneous nucleation. Considering these criteria, chemical compounds suitable for application in disclosed aspects include, but are not limited to, sodium 3-mercapto-1-propanesulfonate (3M1P) with "mercapto" (—SH), sodium 3-hydroseleno-1-propanesulfonate "hydroseleno" (—SeH), a triethoxysilyl compound, a trimethoxysilyl compound, and 3-chloro-1-propanesulfonic acid (3C1P). The 3M1P compound is not expected to displace S atoms in preexisting P—S bonds in the SSE, and is expected to attach to surface Li atoms via Li—S and Li—O bond formation. Importantly, this compound should conduct $Li^+$ because it is an ionic conductor.

Density functional theory (DFT) simulations were applied to gain insight into the interactions between the organic molecule of 3M1P and the Li interface by the adsorption energies. A 2×2×2 super cell with 120 Li atoms was constructed from the 110 interface Li body-centered unit cell. A 20 Å vacuum slab was created to put the organic molecule. The optimized lattice constants were obtained to be a=13.820 Å, b=14.658 Å and c=29.772 Å. According to the adsorption energy results, the organic compound can absorb onto the S atom for all modes. The configuration 3 (III) exhibits a much higher propensity to adsorb onto the Li surface (−2.11 eV) compared to others, indicating 3M1P is inclined to horizontal adsorption on Li surface (the S and Na atoms of 3M1P directly connected Li), facilitating the formation of thinner and stable surface molecular layer than vertical adsorption. Furthermore, the results of Ab initio molecular dynamics (AIMD) shows that many of the Li atoms around O and S atoms tend to be at the distance of about 2 Å, confirming the formation of new covalent interactions between them after the adsorption happened, indicting the formation of Li—O and Li—S bonds, which could support Li ion diffusion on the surface of Li compared to the pristine Li, in line with our expectations regarding the significance of the construction about a Li metal protective layer with two head-function groups.

When the probability distributions of the average displacements of lithium atoms from the supercells with and without the organic molecule are compared, the in-plane (left) displacement refers to the movements of the lithium atoms perpendicular to the crystallographic c-axis in the supercell, and the out-of-plane (right) displacement refers to the movements of the lithium atoms parallel to the crystallographic c-axis in the supercell (the direction of the vacuum slab).

Figure 2A:
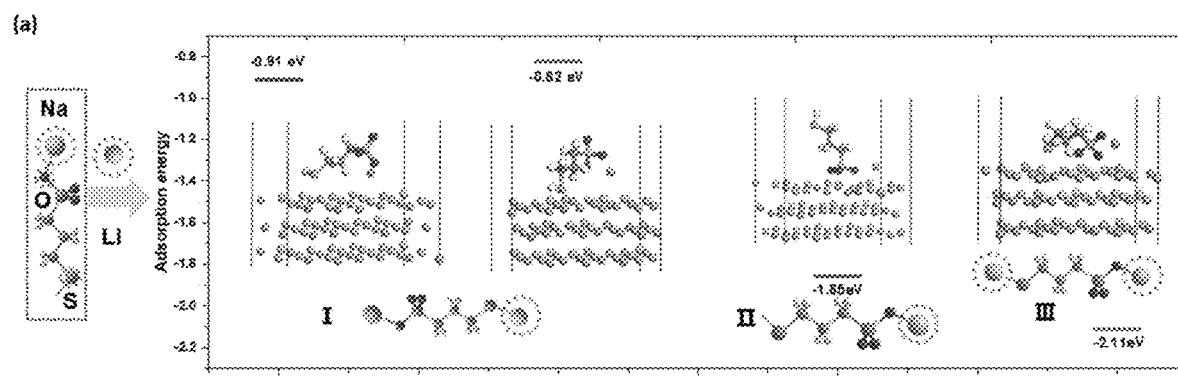
FIGS. 2A-F show details regarding the interface characterization.
Figure 2B:
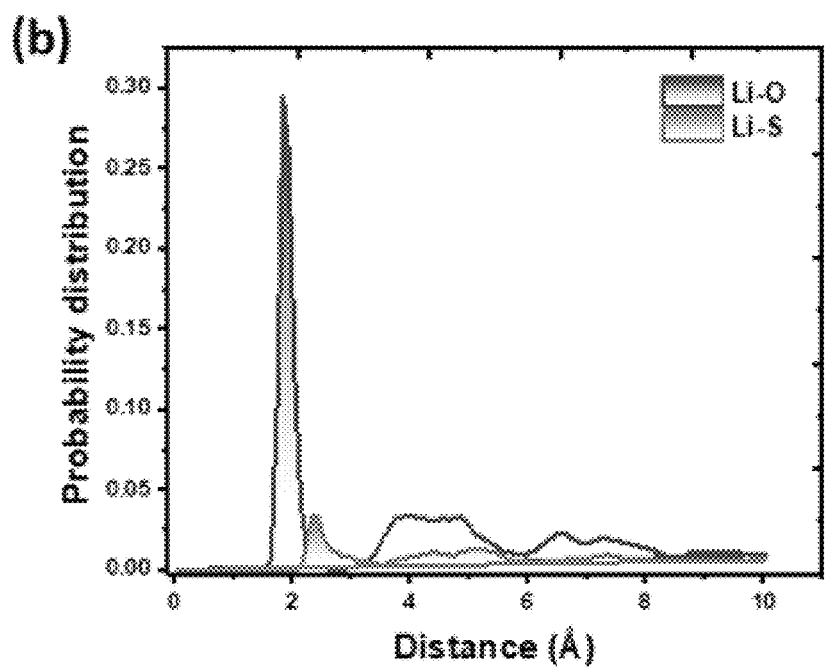
Figure 2C:
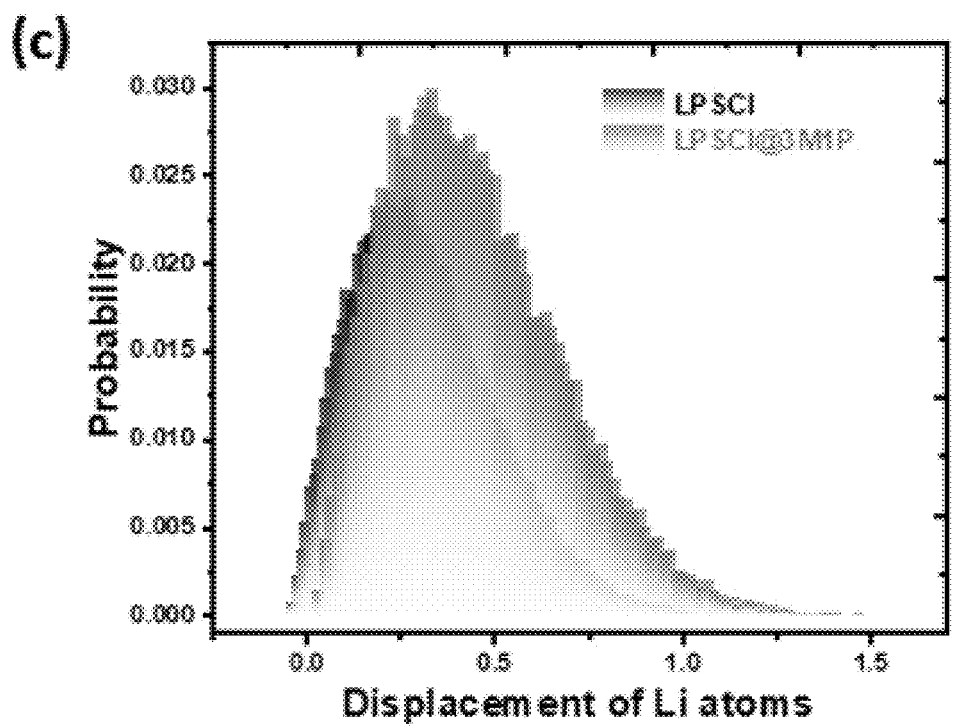
Figure 2D:
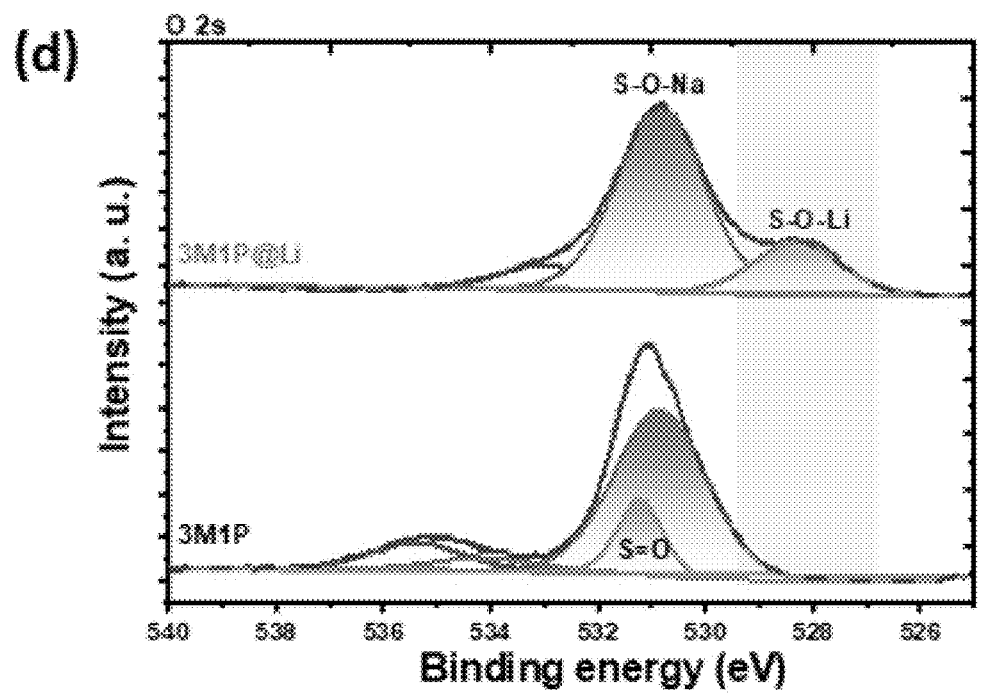
Figure 2E:
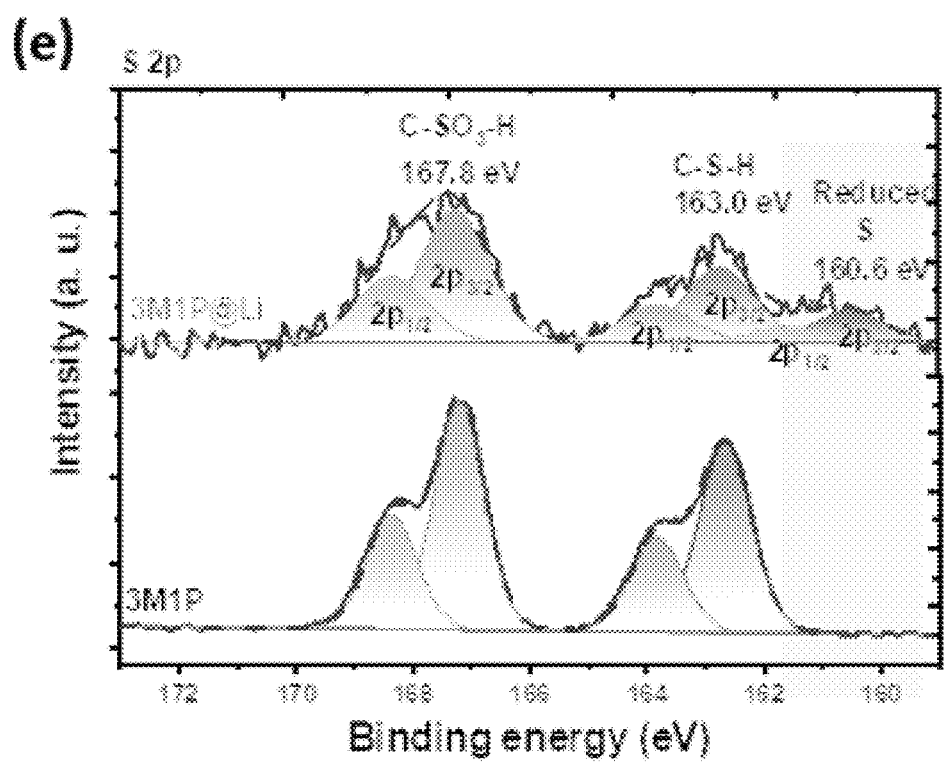
Figure 2F:
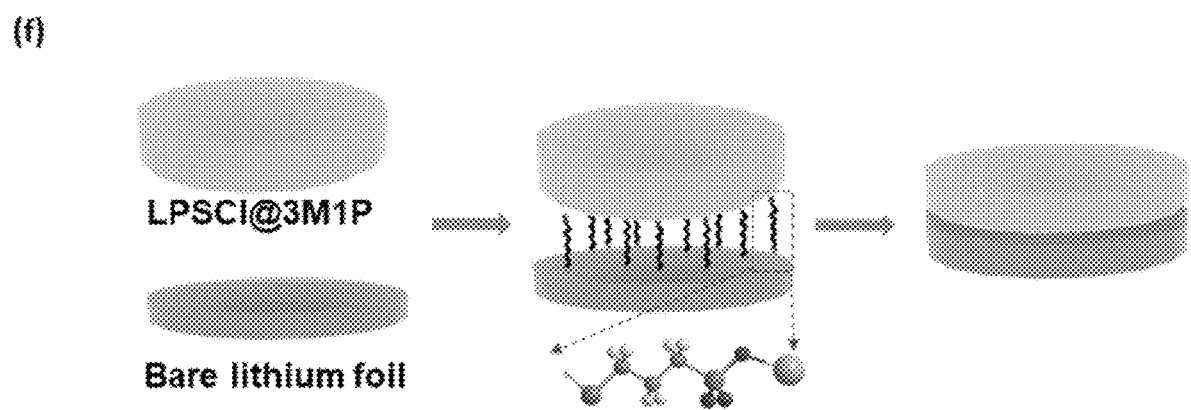

An Li is spectrum confirmed the new bonding in Li@3M1P assignment with the responsive oxide Li peaks at 54.33 eV. Meanwhile, the O 2s (FIG. 2D) can be observed where peaks at 531 and 535 eV can be assigned to S—O—Na and oxides contaminations in pristine Li system, while the peak at 528.5 eV appears, which can be assigned to S—O—Li. In addition, another new peak in the S 2s spectrum can be observed at 160.6 eV which should be related to the reaction between Li atoms and S head-function group. Thus, it can be concluded that the main chemical reaction of Li—O bond formation together with S—Li bond. The NMR data demonstrates the same result that Li metal can react with 3M1P forming some new local structure. FIG. 2D shows XPS data. To confirm the compatibility of this organic compound with the LPSCl electrolyte, an obvious characteristic signal of Na was observed for the LPSCl@3M1P electrolyte. This organic substance does not change the chemical coordination of the LPSCl electrolyte, or affect the local structure of $PS_4^{2-}$. Meanwhile, the $Li^+$ conductivities of LPSCl and LPSCl@3M1P were measured as 1.78 and 1.75 mS cm$^{-1}$, respectively, at 25° C., by electrochemical impedance (AC) spectroscopy with two stainless steel blocking electrodes. Therefore, this organic compound is chemically stable with LPSCl and Li metal.

Figure 3A:
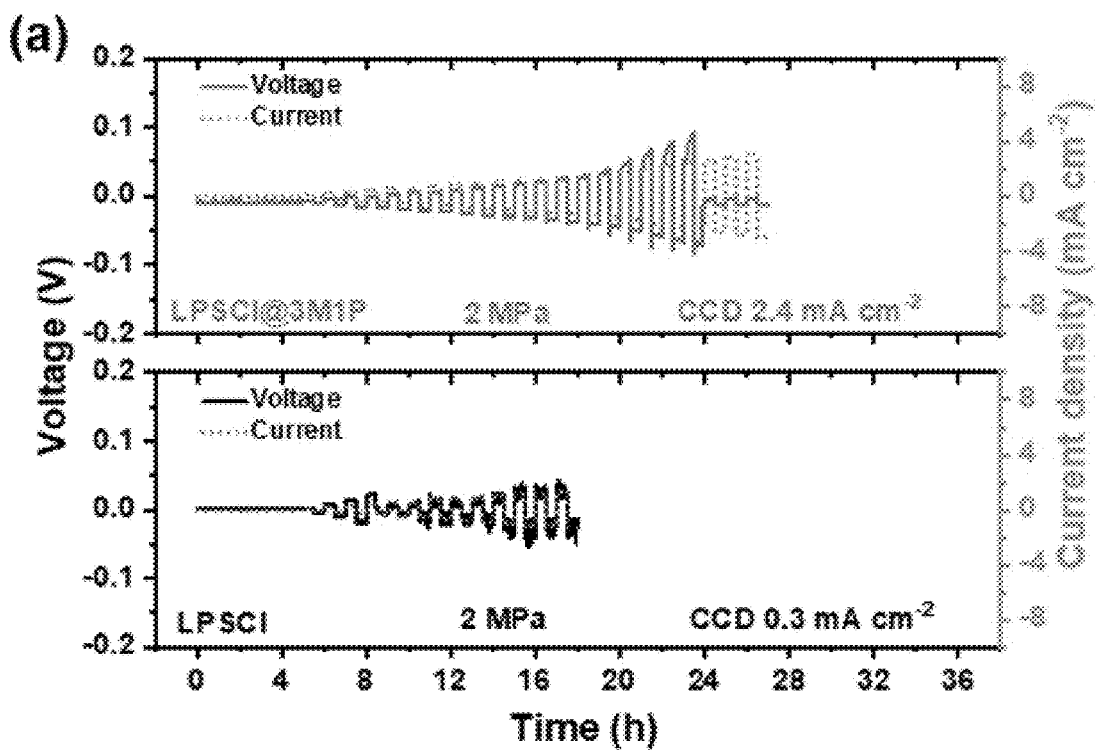
FIGS. 3A-F further show the interface characterization.
Figure 3B:
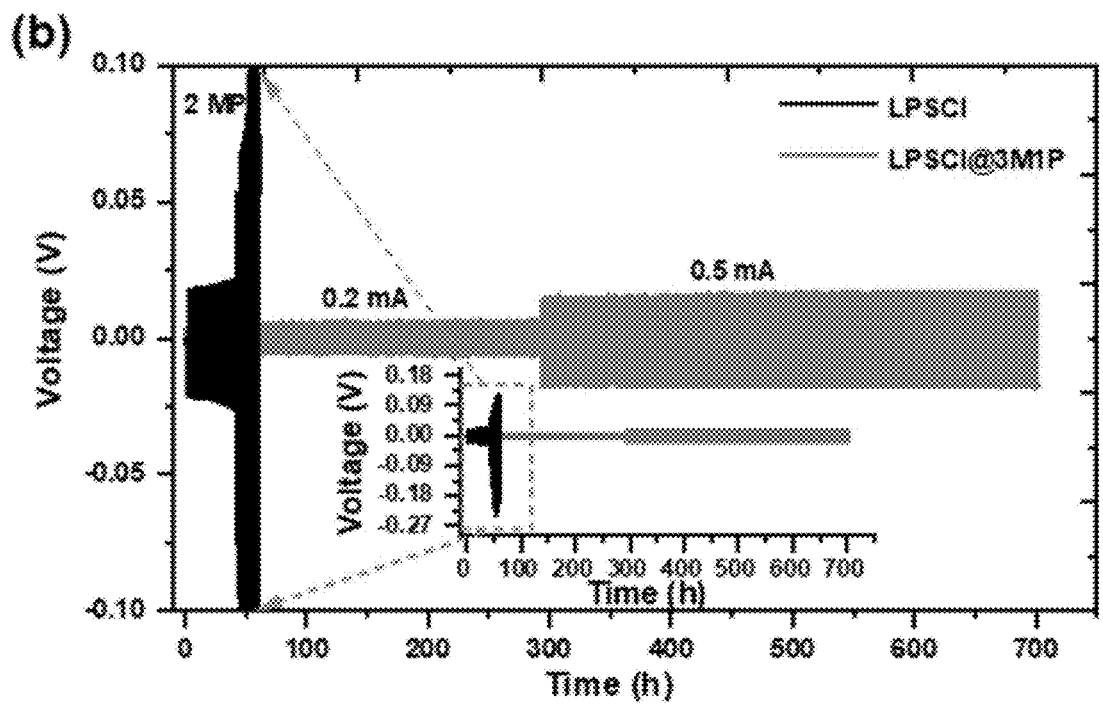

To study the electrochemical performance of the LPSCl@3M1P electrolyte, symmetric all-solid-state Li cells were fabricated using LPSCl and LPSCl@3M1P, with both electrolytes at a low pressure of 2 MPa. FIG. 3A shows the critical current density (CCD) curves of the Li|LPSCl|Li and Li|LPSCl@3M1P|Li symmetric cells at 25° C. The Li|LPSCl@3M1P|Li cell exhibits a CCD of 2.4 mA cm$^{-2}$, which is higher than that of 0.3 mA cm$^{-2}$ in Li|LPSCl|Li cell. Moreover, the symmetric Li|LPSCl@3M1P|Li cell can cycle more than 500 h at a current density of 0.5 mA cm$^{-2}$ at 25° C. as shown in FIG. 3B, which is much longer than the 50 h for symmetric Li|LPSCl|Li cell. The overpotential of Li|LPSCl|Li severely increases to 0.15 V after 40 cycles which may arise from continuous electrolyte decomposition with Li metal and formation of Li dendrite leading to interfacial voids and delamination causing mechanical failures. While the overpotential of Li|LPSCl@3M1P|Li remains at 0.02 V. In the meantime, the Li|LPSCl@3M1P|Li cell can cycle approximately 300 h at 1 MPa. Two possible factors may explain the increased CCD number and cycling stability for LPSCl@3M1P electrolyte. First, LPSCl@3M1P is electrochemical stable with Li metal, in which smoother $Li^+$ transport paths are provided in the interface compared to LPSC. Second, the lithium dendrite on the surface of EES efficiently inhibits.

Figure 3C:
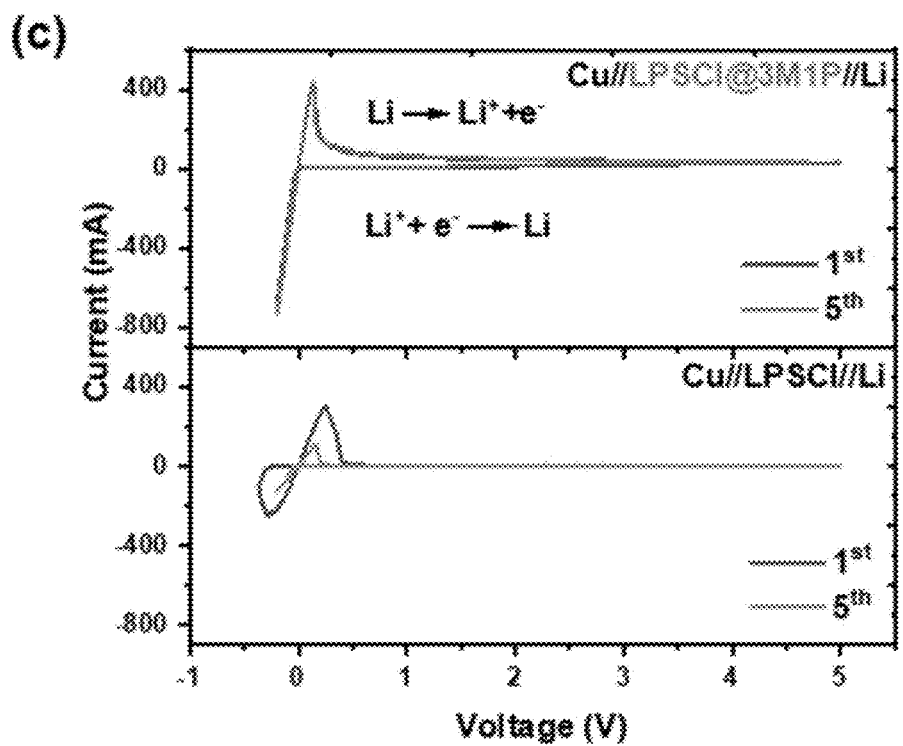

The electrochemical stability of LPSCl@3M1P electrolyte against lithium metal was investigated with cyclic voltammetry (CV) measurements. FIG. 3C demonstrates the redox peaks of Li around 0 V exist for both electrolytes. However, asymmetrical, and broad peaks can be observed for LPSCl due to the side reaction between the SSE and the Li metal after the 5th cycle. This result is like the previously reported argyrodite with Li metal counter electrode that the interface of them is thermodynamically unstable. While the redox peak of LPSCl@3M1P is very symmetrical, sharp and shows a highly stable CV curves against Li metal after the 5th cycle, indicating that the side reaction between Li and the electrolyte can be significantly mitigated resulting in the oxidation/reduction reaction is very reversible.

Figure 3D:
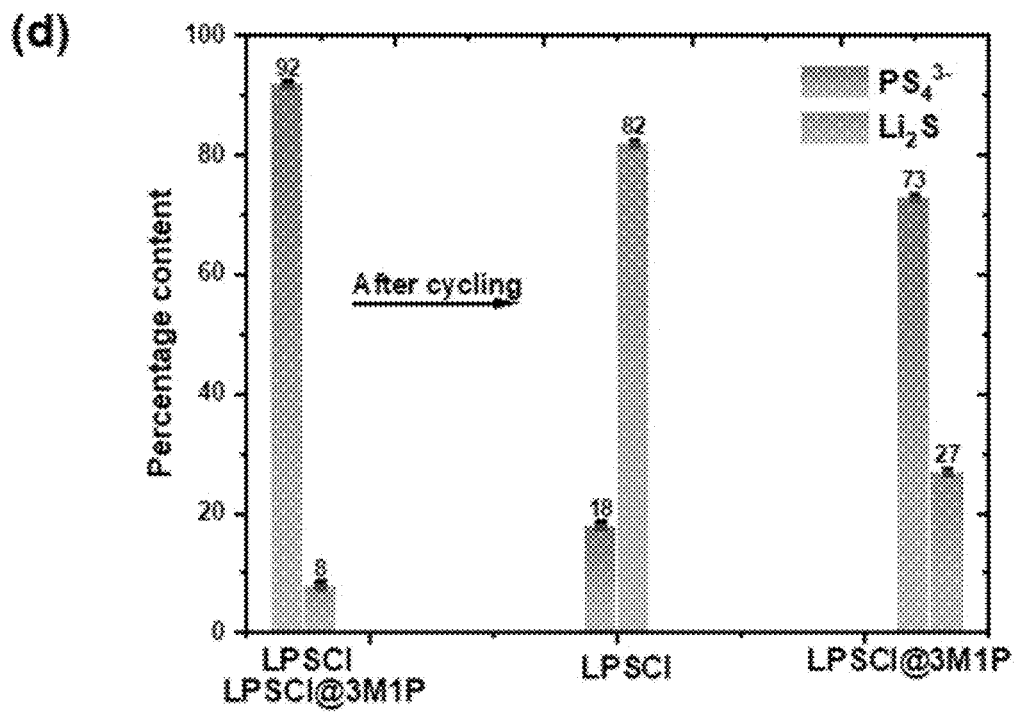

The XPS analysis was performed to further analyze the interfacial side reaction between both electrolytes and Li metal. We compared the S 2p XPS spectra of LPSCl and LPSCl@3M1P at a pristine condition and after the 100th cycle. At the pristine condition, the XPS spectra of two electrolytes shows same peak related to the $PS_4^{3-}$ unit. The XPS spectra after the 100th cycle of two electrolytes exhibited different aspects; see FIG. 3D. The LPSCl spectra shows an increased area of Li2S peak produced by decomposition of electrolytes that possesses 82% of the whole spectra area. Note that the LPSCl@3M1P demonstrates that the decomposition of electrolytes is successfully restrained compared to LPSCl, which shows that the Li2S peak of by-product possessed 38% of the whole spectra area. The result of the XPS analysis verifies that suppressing the decomposition of electrolytes leads to restraining the interfacial resistance between electrolytes and Li metal using LPSCl@3M1P electrolyte after long cycles.

Figure 3E:
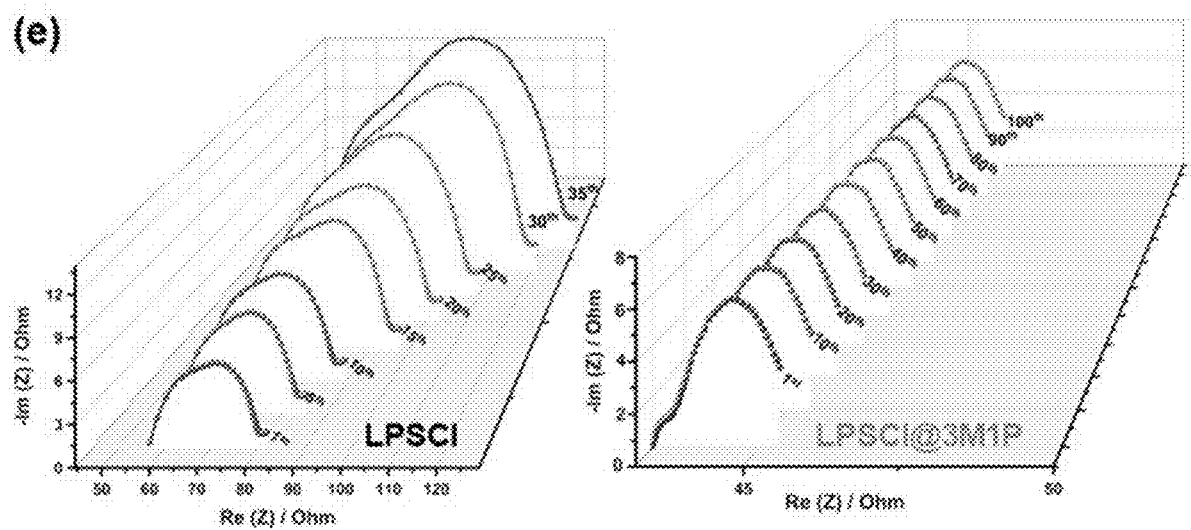

Meanwhile, the in-situ electrochemical impedance spectroscopy of both electrolytes in symmetric cells was examined. The impedance profile in the high-frequency (100 kHz) region indicates the resistance of solid electrolytes. The resistance at the middle-frequency (the peak top frequency of 500 Hz) indicates the interfacial resistance between the Li metal and the electrolytes. The result shows the first intersection with the X axis and semicircles of the LPSCl electrolyte (FIG. 3E) Keep increasing as the cycle increases. The resistance of LPSCl@3M1P shows no change and the interfacial resistance is higher than LPSCL. This implies that the interfacial resistance produced by the decomposition of the solid electrolytes during the charge/discharge cycle can be successfully suppressed by using LPSCl@3M1P. Therefore, the interface between the Li metal anode and the solid electrolytes becomes more electrochemically stable.

Figure 3F:
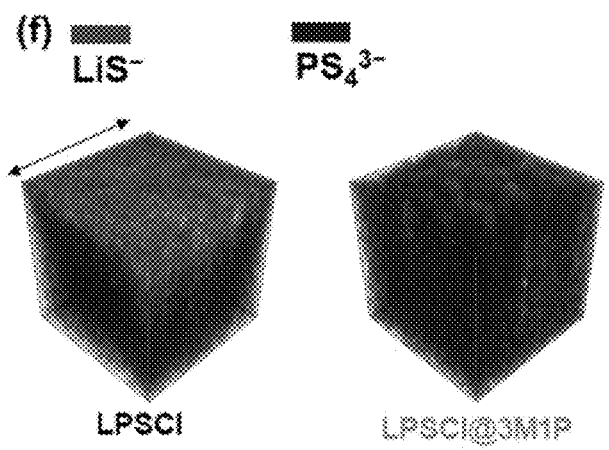

Next, the 3D tomography with a transverse resolution of 100 m was measured via time-of-flight secondary-ion mass spectrometry (TOF-SIMS) to investigate the microstructure of the interface between electrolyte and Li metal, and the SEI. As illustrated in FIG. 3F, the ion fragment of Li2Sx was found to be distributed at the electrolyte surface, which indicated that it generated during the reaction between the lithium metal anode and electrolyte, consistent with the XPS result. On the other hand, another fragment of $PS_4^{3-}$ corresponding to the LPSCl electrolyte for two electrolytes further suggests the 3M1P organic compound effect of SEI formation. For LPSCl, the outer showed a lower content, which could be attributed to the easier reduction processes of anions on the surface of the lithium metal. In contrast, a higher content of $PS_4^{3-}$ was found to be located at the surface layer of the LPSCl@3M1P electrolyte.

As explained above, enhanced electrochemical stability against Li metal of LPSCl@3M1P electrolyte is verified by comprehensive experimental characterizations. Considering enhanced interfacial stability, LPSCl@3M1P electrolyte can suppress the interfacial resistance of composite cathode. By this, the solid electrolyte could be protected from dendrite penetration because Li would not grow at the solid electrolyte/interlayer interface.

Figure 4A:
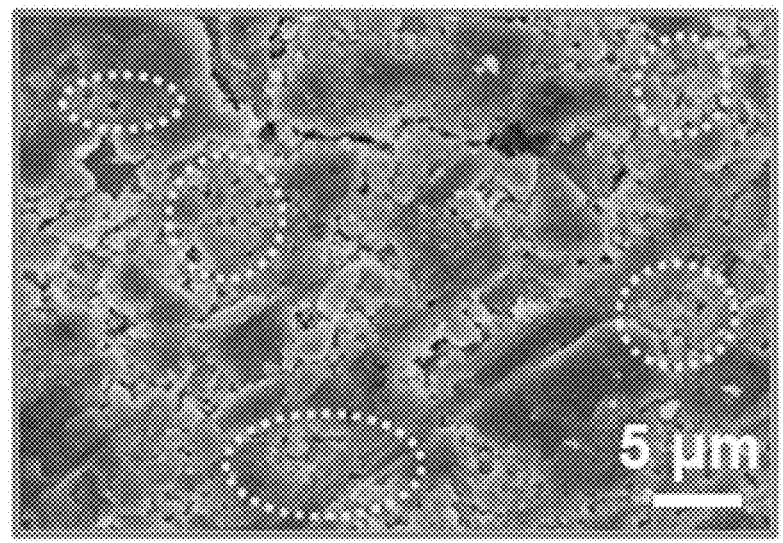
FIGS. 4A-H show details regarding the Li deposition morphology and interfacial kinetics, including: surface morphology of LPSCl (FIG. 4A) and LPSCl@3M1P (FIG. 4B) electrolytes in symmetrical cells after 40 cycles; FIB-SEM cross-sectional images of the stripped Li|LPSCl|Li (FIG. 4C) and Li|LPSCl@3M1P|Li (FIG. 4D) interfaces; FIB-SEM cross-sectional images of the plated Li|LPSCl|Li (FIG. 4E) and Li|LPSCl@3M1P|Li (FIG. 4F) interfaces. The symmetric cells were stripping/plating at current density of 0.2 mA cm$^{-2}$ on a stack pressure of 2 MPa. The images of peeling off Li foil from Li|LPSCl|Li (FIG. 4G) and Li|LPSCl@3M1P|Li (FIG. 4H). The pressure evolution during the cycling of Li|LPSCl|Li and Li|LPSCl@3M1P|Li cells is shown in FIG. 4I.
Figure 4B:
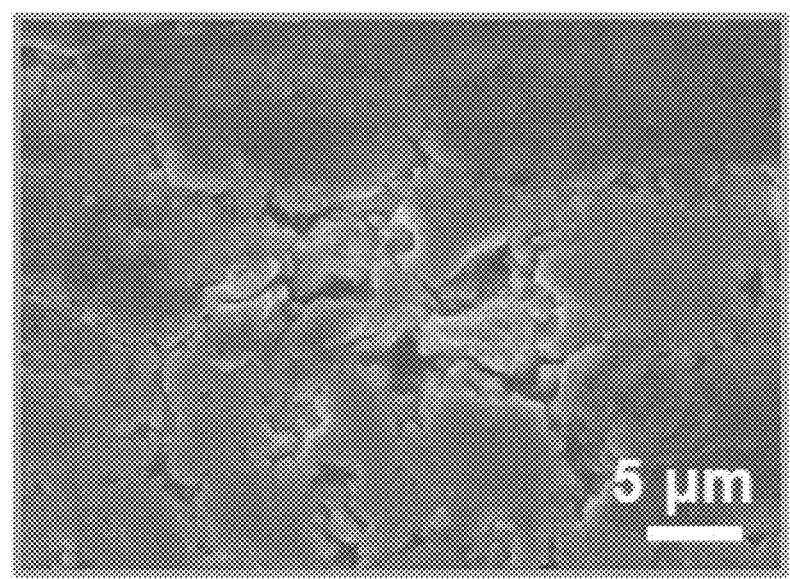

As shown in FIG. 4A, it was found that many pores were distributed at the interface after long cycles in the LPSCl electrolyte compared to the pristine condition. The LPSCl@3M1P interface appears smoother than that of LPSCl. The former may be caused by the decomposition between the electrolyte and Li metal. Moreover, Li plating/stripping after galvanostatic electrodeposition at current density of 0.2 mA cm$^{-2}$ in Li|SSEs|Li symmetric cells (FIGS. 4A and 4B) was carried out to investigate whether the modified electrolyte can suppress parasitic reaction and lithium dendrite growth to enable the low-pressure of 2 MPa operation.

Figure 4C:
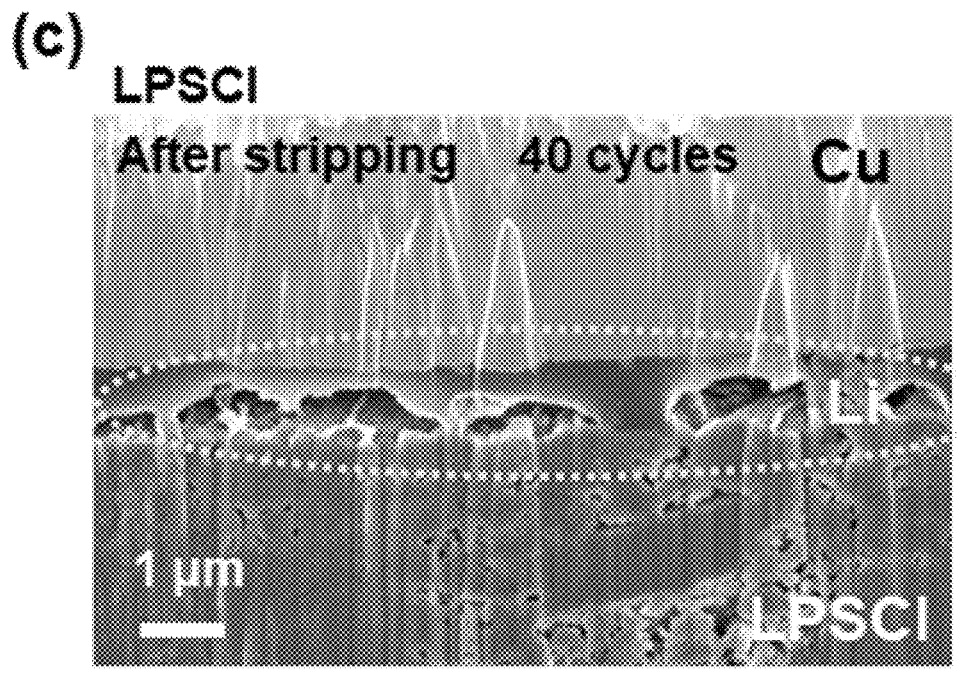
Figure 4D:
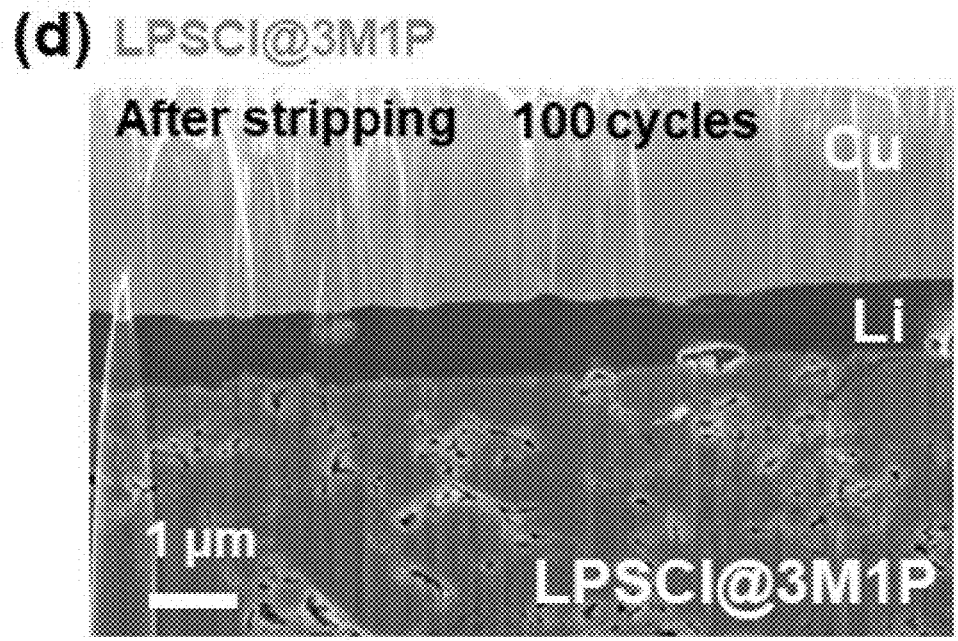
Figure 4E:
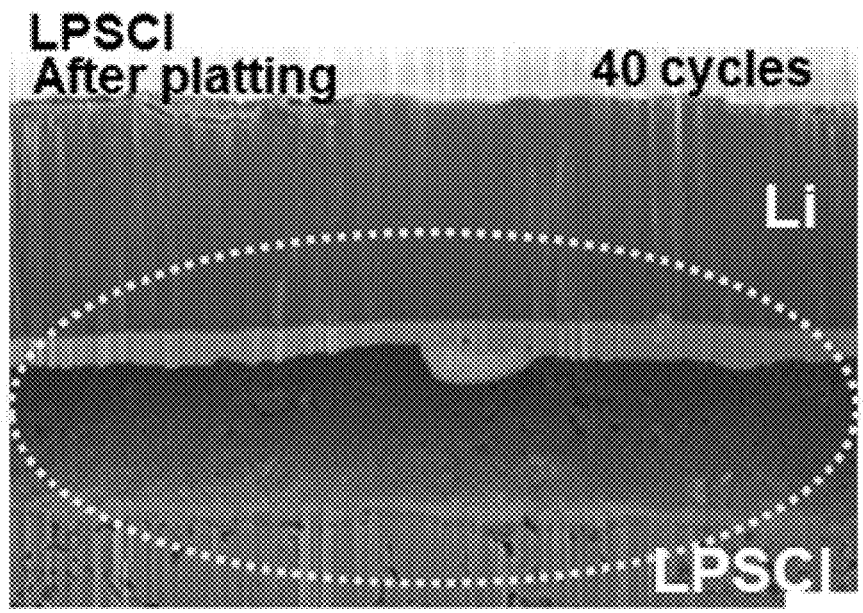

FIGS. 4C and 4D show the cross-sectional cryo-FIB SEM images of the stripped Li|LPSCl and Li|LPSCl@3M1P interfaces after Li deposited to a capacity of 3 mAh cm$^{-2}$ (e.g., a constant charge of 3 mAh cm$^{-2}$, which corresponds to approximately 14.5 mm of Li), respectively, indicating the Li electrode pulverization and voids formation on the Li surface in the region marked with a dotted yellow box, resulting in intact interfacial contacts loss and effect the local Li flux in LPSCl system. No voids were observed on the Li|LPSCl@3M1P electrode, which can be attributed to the homogeneous redistribution of Li flux in the Li plating/stripping process. The Li dendrites formation and severe SEI layer leads to consistent stress generation eventually cause a huge gap between Li metal and electrolyte (FIG. 4E), which is one of the biggest challenges of Li metal cycling, even under the low pressure.

Figure 4F:
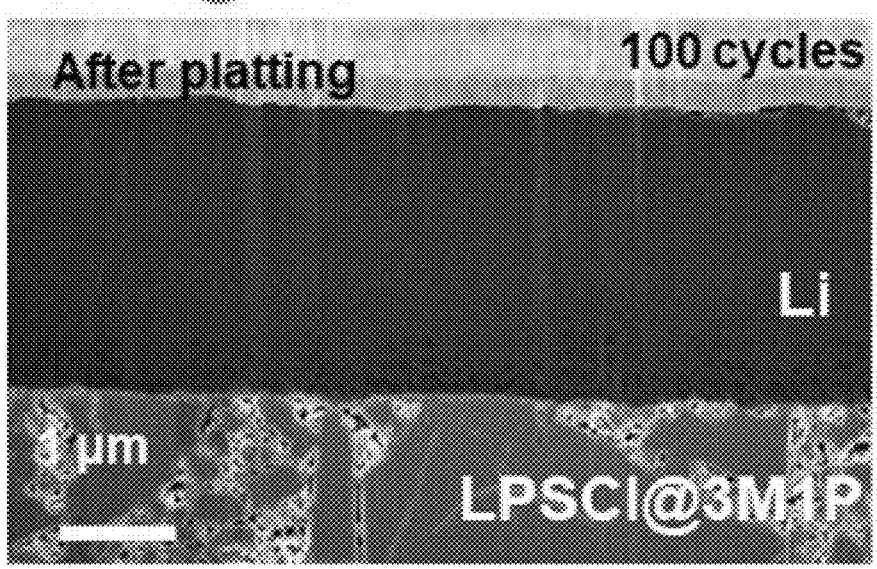

In stark contrast, Li|LPSCl@3M1P|Li demonstrated significantly enhanced intimate interface between Li metal and electrolyte guaranteeing uniform Li-ion fluxes, further inducing homogeneously Li deposited/dissolved on the Cu foil (FIG. 4F). An SEM image showed that the general morphology of the interface of LPSCl has a huge gap between electrolyte and Li metal. The interface of the Li|LPSCl@3M1P|Li electrode is more stable and smoother, without obvious dendrite and gap formation after cycling, which can be attributed to the homogeneous lithium plating/stripping process.

Figure 4G:
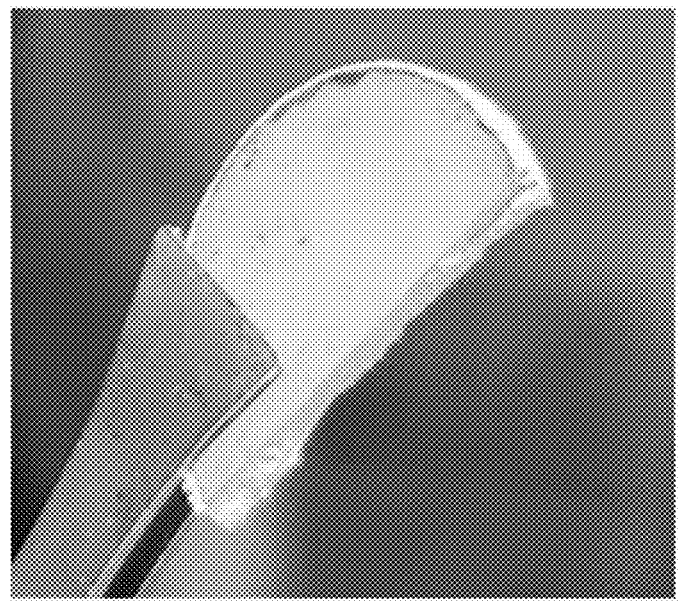
Figure 4H:
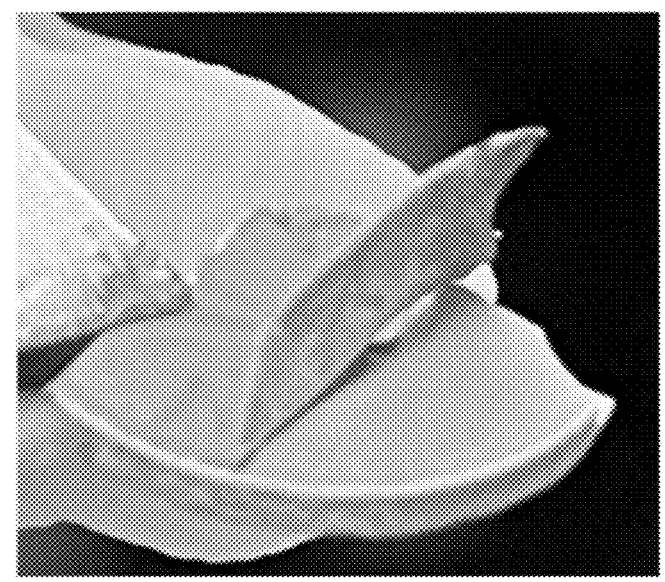
Figure 4I:
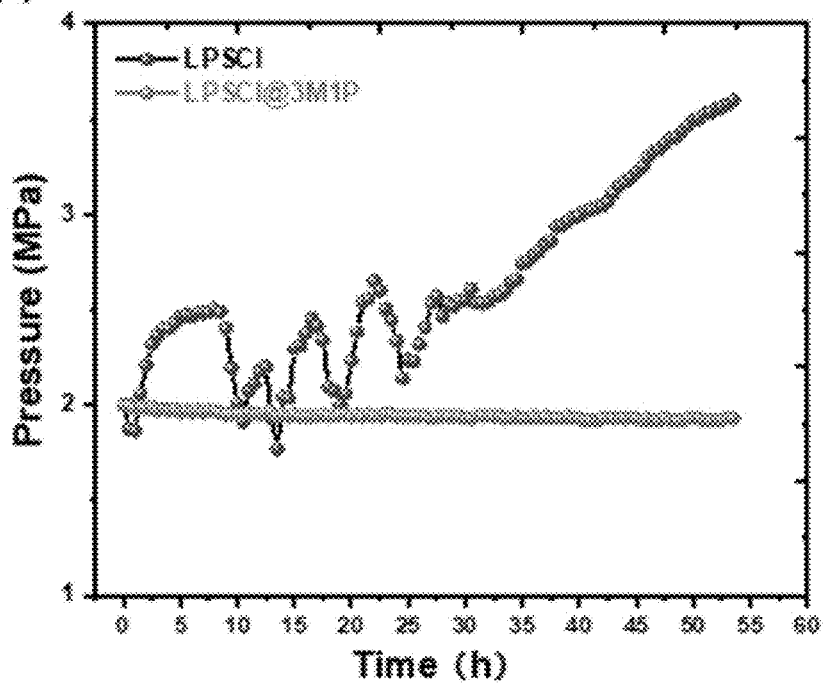

Thus, the LPSCl electrolyte, when combined with Li metal, undergoes a severe side reaction resulting in heterogeneous Li morphology and Li$^+$ flux during cycling, ultimately leading to a short circuit and cell failure. A significant difference can be observed for the modified electrolyte of LPSCl@3M1P during plating and stripping. The surface and cross-section morphology shows almost no change, which is attributed to the stable electrochemical interface between electrolyte and Li metal, achieving homogeneous Li$^+$ flux and resisting the Li dendrite penetration. These characteristics will affect some physical properties of both electrolytes. Interestingly, it is found that the Li foil is difficult to peel off from the SSE in the LPSCl electrolyte (FIG. 4G). In contrast, it appears to be easily achievable for LPSCl@3M1P (FIG. 4H). Additionally, the stress evolution response of both electrolytes is entirely different. The (dis) charge time and associated cell's internal stress profiles are displayed in FIG. 4I, demonstrating the huge mechanical responses Li|LPSCl|Li during electrochemical process, resulting in an irreversible increase in pressure due to progressive contact loss and delamination.

An aspect of the present disclosure relates to a solid-state battery comprising a solid electrolyte material as an electrolyte. Specific examples of the solid-state battery include any type of primary battery, secondary battery, fuel cell, solar cell or capacitor such as a super capacitor. In particular, the secondary battery is, to be specific, a lithium-ion secondary battery. Aspects of the disclosure here may be implemented in a secondary battery with various form factors or battery formats, including for example in a pouch-type battery, a cylindrical battery, or a prismatic battery.

In an aspect of the disclosure, the solid-state battery according to the present disclosure comprises a negative electrode, a positive electrode and a solid electrolyte interposed between the negative electrode and the positive electrode. Hereinafter, the configuration and effect of the present disclosure will be described in detail.

In the present disclosure, the solid electrolyte composition comprises a sulfide-containing solid electrolyte material that has an organic coating, such as a compound of Chemical Formula 1, including but not limited to a thiol, a hydroseleno, an alkyl silane, and an alkyl halide. The halogen moiety of the alkyl halide is not particularly limited and may include any halogen such as, for example, fluorine (F), chlorine (Cl), bromine (Br), or iodine (I). In aspects, the thiol may be sodium 3-mercapto-1-propanesulfonate (3M1P), the hydroseleno may be sodium 3-hydroseleno-1-propanesulfonate, the alkyl silane may be a triethoxysilyl compound or a trimethoxysilyl compound, and the alkyl halide may be 3-chloro-1-propanesulfonic acid (3C1P).

For purposes of the present disclosure, any suitable sulfide-containing electrolyte material may be used. As used here, "sulfide-based electrolyte" refers to an electrolyte that includes inorganic materials containing S which conduct ions (e.g., Li$^+$), and which are suitable for electrically insulating the positive and negative electrodes of an electrochemical cell. Exemplary sulfide-containing electrolytes are set forth in Shaojie Chen et al., "*Sulfide solid electrolytes for all-solid-state lithium batteries: Structure, conductivity, stability and application,*" Energy Storage Materials, Volume 14, Pages 58-74 (September 2018), which is hereby expressly incorporated by reference in its entirety.

For example, many sulfide-containing electrolyte materials are particularly attractive due to their superionic conductivities (as high as ~10$^{-2}$ S cm$^{-1}$) and deformability. In particular, Li$_3$P$_7$S$_{11}$, Li$_{10}$GeP$_2$Si$_2$, and Na$_3$PS$_4$ and Li$_6$PS$_5$Cl have been reported to exhibit high ionic conductivities, e.g., some even close to those of liquid electrolytes. According to aspects of the disclosure, the sulfide solid electrolyte materials also provide a low Young's modulus, which is beneficial for producing favorable interface contacts with electrode materials by simple cold pressing at room temperature.

The sulfide-containing solid electrolyte, according to aspects of the disclosure, may contain sulfur (S) and have the ionic conductivity of metal belonging to Group I or II in the periodic table, e.g., Li$^+$. Additionally, in an aspect of the present disclosure, the selected solid electrolyte has the ionic conductivity of 1×10$^{-5}$ S/cm, or according to some aspects of the disclosure, 1×10$^{-3}$ S/cm or more.

Non-limiting examples of the sulfide-containing solid electrolyte may include Li—P—S-based glass, Li—P—S-based glass ceramic and argyrodite-based sulfide-containing solid electrolyte.

Non-limiting examples of the sulfide-containing solid electrolyte may include at least one of xLi$_2$S-yP$_2$S$_5$, Li$_2$S—LiI—P$_2$S$_5$, Li$_2$S—LiI—Li$_2$O—P$_2$S$_5$, Li$_2$S—LiBr—P$_2$S$_5$, Li$_2$S—Li$_2$O—P$_2$S$_5$, Li$_2$S—Li$_3$PO$_4$—P$_2$S$_5$, Li$_2$S—P$_2$S$_5$—P$_2$O$_5$, Li$_2$S—P$_2$S$_5$—SiS$_2$, Li$_2$S—P$_2$S$_5$—SnS, Li$_2$S—P$_2$S$_5$—Al$_2$S$_3$, Li$_2$S—GeS$_2$ or Li$_2$S—GeS$_2$—ZnS, Li6PS5X (X=at least one of Cl, Br or I).

In an aspect of the present disclosure, the sulfide-containing solid electrolyte may comprise at least one selected from LPS-based glass or glass ceramic such as xLi$_2$S-yP$_2$S$_5$, or an argyrodite-based sulfide-containing solid electrolyte (Li$_6$PS$_5$X; X=Cl, Br, I).

The sulfide-containing solid electrolyte material is processed to form a coating on its surface. The sulfur or leaving group appears to react with the sulfur in the electrolyte material to interact non-covalently, or form a covalent bond, e.g., a sulfide bond or a disulfide bond.

The sulfur of the organic compound may be attached to the surface of the solid electrolyte material, (e.g., perhaps forming disulfide bond or a sulfide bond at one end), and the hydrophobic tail is arranged to surround the electrolyte material. This hydrophobic layer creates a barrier for water, and provides protection to the electrolyte material.

To form an organic coating, the sulfide-containing solid electrolyte material may be combined with at least one compound of Chemical Formula 1:

A—R—W    Chemical Formula 1 wherein:
A is a halogen, SH, or a leaving group;
R is a substituted or unsubstituted C3-C20 alkylene group; and
W is a sulfonate, a phosphonate, or a salt thereof.

In certain aspects each R group is independently selected so that the compound of Chemical Formula 1 will be a liquid. According to some aspects of the disclosure, the total number of carbons (including the chain and substituents) will be from 6 to 16 carbons, or according to some aspects of the disclosure, from 6 to 12 carbons, from 8 to 12 carbons, or from 10 to 12 carbons. The compound of Chemical Formula 1 may have a total of 6 carbons, 7 carbons, 8 carbons, 9 carbons, 10 carbons, 11 carbons, 12 carbons, 13 carbons, 14 carbons, 15 carbons, 16 carbons, 17 carbons, 18 carbons, 19 carbons, or 20 carbons. If the total number of carbons is too low, the compound may be too volatile for use. If the total number of carbons is too high, the compound may not be a liquid. Thus, according to some aspects of the disclosure, the number of total carbons, as well as the substituents and main chains can be adjusted as needed so that the compound is a liquid.

Each R group is independently a substituted or unsubstituted C3-C20 alkyl group, including, but not limited to a substituted or unsubstituted n-propyl, isopropyl, n-butyl, isobutyl, sec-butyl, tert-butyl, n-pentyl, tert-pentyl, isopentyl, n-hexyl, isohexyl, sec-hexyl, tert-hexyl, n-heptyl, isoheptyl, sec-heptyl, tert-heptyl, n-octyl, isooctyl, sec-octyl, tert-octyl, n-nonyl, isononyl, sec-nonyl, tert-nonyl, n-decyl, isodecyl, sec-decyl, tert-decyl, n-undecyl, isoundecyl, sec-undecyl, tert-undecyl, n-dodecyl, isododecyl, sec-dodecyl, tert-dodecyl, etc.

The R group may be substituted with one or more groups, including but not limited to ester, ketone, halogen (fluorine, chlorine, bromine), and/or one or more C3-C20 alkyl groups (e.g., a C3-C8 alkyl group). In some aspects, the R group may be substituted with an aryl (e.g., phenyl) or a heteroaryl group (e.g., a five or six membered ring, including but not limited to pyridine, pyrrole, furan, or thiophene).

The term "leaving group" may be understood as defined by the IUPAC, e.g., it may be an atom or group of atoms that detaches from the main or residual part of a substrate during a reaction or elementary step of a reaction. For instance, a leaving group may be a fragment that departs with a pair of electrons in heterolytic bond cleavage. In certain aspects, leaving groups may be anions or neutral species, departing from neutral or cationic substrates. Suitable leaving groups may be used, which are compatible with the solid electrolyte material.

In some aspects, the A group may be an "alkyl silane" such as a "triethoxysilyl" moiety (e.g., derived from HSi(OC$_2$H$_5$)$_3$) or "trimethoxysilyl" (e.g., derived from HSi(OCH$_3$)$_3$).

The term "thiol" may be understood as an organosulfur compound of the form R—SH, where R represents an alkyl or other organic substituent.

The term "alkyl halide" may be understood as an organohalide compound of the form R—X, where R represents an alkyl or other organic substituent, and X represents a halogen.

The term "isocyanate" may be understood as a functional group with the formula R—N=C=O, where R may be an alkyl or aryl group.

The term "amine" may be understood as a compound or a functional group that contains a basic nitrogen atom with a lone pair. Amines are formally derivatives of ammonia (NH$_3$), wherein one or more hydrogen atoms have been replaced by a substituent such as an alkyl or aryl group (e.g., alkylamines and arylamines). The substituent —NH$_2$ is called an amino group. In certain aspects, the amine may include primary amines, secondary amines, and/or tertiary amines. In certain aspects, amino groups can be further converted into a useful leaving group, e.g., by conversion to an ammonium salt, aryl(sulfonyl)amino groups, etc.

In some aspects, the sulfide-containing solid electrolyte material, and the compound of Chemical Formula 1 may be combined in a weight ratio of about 1:1 to 25:1, or according to some aspects, a weight ratio of about 1:1 to 10:1, a weight ratio of about 1:1 to 5:1, or a weight ratio of about 1:1.

Since sulfide-containing materials are sensitive to air and moisture, and might decompose to produce toxic gas such as H$_2$S, all the synthesis and test steps are, according to some aspects of the disclosure, performed in a glovebox or suitable apparatus (e.g., MBraun MB 200B, H$_2$O<0.5 ppm, O$_2$<5.0 ppm) filled with argon. Optionally, the reaction mixture of the sulfide-containing solid electrolyte material, and the compound of Chemical Formula 1 may further comprise a suitable solvent to aid in the dispersion.

Suitable reaction conditions may be used. In an aspect, the reaction temperature may be from room temperature to about 50° C. In some aspects, the reaction temperature may be from about 15° C. to about 40° C., from about 20° C. to about 40° C., from about 25° C. to about 40° C.

In an aspect, the reaction time may be about 30 minutes. In some aspects, the reaction time may be from about 1 hour to about 8 hours, and according to some aspects, from about 2 hours to about 7 hours or from about 3 hours to about 5 hours.

The progress of the reaction can be monitored using any suitable technique, including but not limited to a suitable technique, e.g., such as X-ray Photoelectron Spectroscopy or Nuclear Magnetic Resonance (NMR).

After the reaction is complete, the coated solid electrolyte material may be dried under any suitable conditions. In an aspect, the drying temperature will be from about 30° C. to about 100° C., from about 40° C. to about 100° C., from about 50° C. to about 100° C. According to some aspects of the disclosure, the drying is conducted under vacuum conditions. In one aspect, the drying time will be 30 minutes or longer. In another aspect, the drying time will be one hour or longer, and, according to some aspects, 2 hours or longer, 8 hours or longer, or 12 hours or longer.

In the present disclosure, the average particle size of the sulfide-containing solid electrolyte material may be adjusted to an appropriate range for the solid-state battery. In some aspects of the present disclosure, the solid electrolyte may have an average particle size of 0.1 μM to 50 μM.

In some aspects of the present disclosure, the solid electrolyte membrane may be manufactured by any suitable method.

For example, after the solid electrolyte material is coated, it may optionally be combined with other components if needed, and mixed to obtain a homogenous mixture. Subsequently, this mixture may be added to a predetermined organic solvent and dispersed to prepare a slurry, the slurry is applied to a release plate, and then dried to form a sheet shape. If necessary, the result of the sheet shape may be pressed to obtain a solid electrolyte membrane.

The thickness of the solid electrolyte layer formed by the lithium-tin-metal-sulfide-based compound is greatly different depending on the structure of the all-solid-state battery. However, for example, according to some aspects, it may be 0.1 µm or more and 1 mm or less, and according to additional aspects, 1 µm or more and 100 µm or less. The solid electrolyte, according to some aspects, has high lithium-ion conductivity, and the lithium ion conductivity at room temperature is, according to some aspects, $1 \times 10^{-4}$ S/cm or more, for example.

In an aspect, the solid electrolyte may further include a solid electrolyte commonly used in the all-solid-state battery. As an example, an inorganic solid electrolyte or an organic solid electrolyte may be used.

In the case of the inorganic solid electrolyte, a ceramic material, a crystalline material or an amorphous material may be used, and the inorganic solid electrolytes such as thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_5PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_6BaLa_2Ta_2O_{12}$, $Li_3PO_{(4-3/2w)}Nw$ (wherein w is w<1), and $Li_{3.6}Si_{0.6}P_{0.4}O_4$ can be used.

In addition, examples of the organic solid electrolyte include organic solid electrolytes prepared by mixing lithium salt to polymeric materials such as polyethylene derivatives, polyethylene oxide derivatives, polypropylene oxide derivatives, phosphate ester polymers, agitation lysine, polyester sulfide, polyvinyl alcohol, and polyvinylidene fluoride. In this case, these may be used alone or in combination of at least one.

The above-described coated sulfide-containing electrolyte material can be used for a solid electrolyte for an all-solid-state battery. The all-solid-state battery contains a positive electrode, a negative electrode, with the solid electrolyte interposed therebetween.

Meanwhile, the positive electrode and the negative electrode for the all-solid-state battery according to aspects of the present disclosure are not particularly limited and any suitable one known in the art can be used.

The all-solid-state battery proposed according to aspects of the present disclosure defines the constitution of the solid electrolyte as described above, and the other elements constituting the battery, that is, the positive electrode and the negative electrode, are not particularly limited in the present disclosure and follow the description below.

In an aspect, the negative electrode for the all-solid-state battery is a lithium metal alone, or negative electrode active material can be laminated on the negative electrode current collector.

The negative electrode current collector is not particularly limited as long as it is conductive without causing any chemical change in the all-solid-state battery, and for example, copper, stainless steel, aluminum, nickel, titanium, sintered carbon, copper or stainless steel whose surface is treated with carbon, nickel, titanium, silver or the like, or aluminum-cadmium alloy, etc. can be used. Additionally, as with the positive electrode current collector, the negative electrode current collector may include various forms such as a film, a sheet, a foil, a net, a porous body, a foam, and a nonwoven fabric having minute irregularities formed on their surfaces.

The negative electrode active material may be one or more of a lithium metal, a lithium alloy, a lithium metal composite oxide, a lithium-containing titanium composite oxide (LTO), and a combination thereof. In this case, the lithium alloy may be an alloy of lithium and at least one metal selected from Na, K, Rb, Cs, Fr, Be, Mg, Ca, Sr, Ba, Ra, Al and Sn. Also, the lithium metal composite oxide may be lithium and an oxide ($MeO_x$) of any one metal (Me) selected from the group consisting of Si, Sn, Zn, Mg, Cd, Ce, Ni and Fe and for example, may be $Li_xFe_2O_3$ ($0 \leq x \leq 1$) or $Li_xWO_2$ ($0 \leq x \leq 1$).

In addition, the negative electrode active material may comprise metal composite oxides such as $Sn_xMe_{1-x}Me'O_z$ (Me:Mn, Fe, Pb, Ge; Me':Al, B, P, Si, elements of groups 1, 2 and 3 of the periodic table, halogen: $0<x=1:1=y=3$; $1=z=8$): oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and carbon-based negative electrode active materials such as crystalline carbon, amorphous carbon or carbon composite may be used alone or In combination of two or more.

In some aspects of the present disclosure, the positive electrode may comprise a positive electrode active material layer comprising a positive electrode active material, a positive electrode conductive material and a solid electrolyte. The positive electrode active material layer may further comprise a binder resin for the positive electrode if necessary. Additionally, the positive electrode comprises a current collector if necessary, and the positive electrode active material layer may be positioned on at least one surface of the current collector.

In some aspects of the present disclosure, the positive electrode active material may comprise at least one of lithium cobalt oxide ($LiCoO_2$), lithium nickel oxide ($LiNiO_2$), lithium manganese oxide of Formula $Li_{1+x}Mn_{2-x}O_4$ (x is 0 to 0.33, for example $LiMn_2O_4$), $LiMnO_3$, $LiMn_2O_3$, $LiMnO_2$, lithium copper oxide ($Li_2CuO_2$); vanadium oxide such as $LiV_3O_8$, $LiV_2O_4$, $V_2O_5$, $Cu_2V_2O_7$, Ni-site lithium nickel oxide represented by Formula $LiNi_{1-x}M_xO_2$ (M=Co, Mn, Al, Cu, Fe, Mg, B or Ga, $0<x<1$), for example, $LiNi_{1-z}(Co,Mn,Al)_zO_2$ ($0<z<1$); lithium manganese composite oxide represented by Formula $LiMn_{2-x}M_xO_4$ (M=Co, Ni, Fe, Cr, Zn or Ta, x=0.01~1, for example, $LiMn_{1.5}Ni_{0.5}O_4$ or $Li_2Mn_3MOs$ (M=Fe, Co, Ni, Cu or Zn); $LiMn_2O_4$ with partial substitution of alkali earth metal ion for Li in Formula; disulfide compounds; $Fe_2(MoO_4)_3$, or lithium iron phosphate ($LiFePO_4$). In some aspects of the present disclosure, the lithium iron phosphate may have all or at least part of the active material particle surface coated with a carbon material to improve conductivity.

According to aspects of the disclosure, the positive electrode active material may comprise at least one selected from Lithium Nickel Cobalt Manganese Oxide (for example, Li(Ni,Co,Mn)$O_2$, $LiNi_{1-z}(Co,Mn,Al)_zO_2$ ($0<z<1$)), Lithium Iron Phosphate (for example, LiFePO4/C), Lithium Nickel Manganese Spinel (for example, $LiNi_{0.5}Mn_{1.5}O_4$), Lithium Nickel Cobalt Aluminum Oxide (for example, Li(Ni,Co,Al)$O_2$), Lithium Manganese Oxide (for example, $LiMn_2O_4$) and Lithium Cobalt Oxide (for example, $LiCoO_2$).

According to some aspects of the present disclosure, the positive electrode active material may comprise lithium transition metal composite oxide, and the transition metal may comprise at least one of Co, Mn Ni or Al.

In some aspects of the present disclosure, the lithium transition metal composite oxide may comprise at least one of compounds represented by the following formula 1.

$$Li_xNi_aCo_bMn_cM_zO_y \quad \text{[Formula 1]}$$

In the above Formula 1, $0.5 \leq x \leq 1.5$, $0 < a \leq 1$, $0 \leq b < 1$, $0 \leq c < 1$, $0 \leq z < 1$, $1.5 < y < 5$, a+b+c+z is 1 or less, and M may comprise at least one selected from Al, Cu, Fe, Mg and B.

In some aspects of the present disclosure, the positive electrode active material includes a positive electrode active material having high Ni content of a of 0.5 or more, and its specific example may comprise $LiNi_{0.8}Co_{0.1}Mn_{0.1}O_2$.

In some aspects of the present disclosure, the positive electrode conductive material may be, for example, at least one conductive material selected from the group consisting of graphite, carbon black, carbon fibers or metal fibers, metal powder, conductive whiskers, conductive metal oxide, activated carbon or polyphenylene derivatives. More specifically, the positive electrode conductive material may be at least one conductive material selected from the group consisting of natural graphite, artificial graphite, super-p, acetylene black, ketjen black, channel black, furnace black, lamp black, thermal black, denka black, aluminum powder, nickel powder, zinc oxide, potassium titanate and titanium oxide.

The current collector is not limited to a particular type and may include those having high conductivity without causing a chemical change in the corresponding battery, for example, stainless steel, copper, aluminum, nickel, titanium, sintered carbon, or aluminum or stainless steel treated with carbon, nickel, titanium and silver on the surface.

The positive electrode binder resin may include a polymer for electrodes commonly used in the technical field. Non-limiting examples of the binder resin may include, but are not limited to, polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose.

In some aspects of the present disclosure, the solid electrolyte included in the positive electrode may comprise at least one selected from a polymer-based solid electrolyte, an oxide-based solid electrolyte and a sulfide-containing solid electrolyte. In some aspects of the present disclosure, the positive electrode active material may comprise the sulfide-containing solid electrolyte described in the solid electrolyte membrane.

In some aspects of the present disclosure, the positive electrode active material is included in the positive electrode in an amount of 50 wt % or more based on 100 wt % of the positive electrode active material layer. Additionally, the solid electrolyte is, according to aspects of the disclosure, included in the positive electrode in an amount of 10 wt % to 40 wt % based on 100 wt % of the positive electrode active material layer.

Meanwhile, in some aspects of the present disclosure, the positive electrode may have a loading amount (per electrode area) of 5 mAh/cm² or more, 6 mAh/cm² or more, or 10 mAh/cm² or more. In the battery according to the present disclosure, when the high loading positive electrode is applied, it is possible to operate the battery on the electrochemically stable level.

Meanwhile, in some aspects of the present disclosure, the positive electrode active material layer may be obtained by adding the positive electrode active material, the conductive material, the binder resin and the solid electrolyte to an appropriate solvent to prepare a slurry and casting the slurry, or may be obtained by a manufacturing method according to a dry mixing process without a solvent. Meanwhile, in some aspects of the present disclosure, it is possible to achieve the uniform mixing of the positive electrode materials in the positive electrode, thereby obtaining a high loading positive electrode, and in this aspect, the positive electrode is obtained by the dry mixing process using no solvent.

The method of manufacturing the positive electrode active material layer by the dry mixing method may be described, for example, as below. First, the positive electrode materials comprising the positive electrode active material, the conductive material and the binder resin are put into a mixing device and mixed by a mechanical method to obtain a mixture. The mixing device includes any type of device that can form a comparatively homogeneous mixture phase such as a well-known mixer agitator, and is not limited to a particular type of device. Meanwhile, in some aspects of the present disclosure, to improve the dispersion of solids and induce the fibrous form of the binder resin in the mixing process, a temperature rising process may be included. In the temperature rising process, the temperature may be appropriately controlled in the range of about 30° C. to 100° C.

Subsequently, the positive electrode active material layer may be formed by extracting the mixture into the shape of an electrode (a wide film shape) using an extruder, and adjusting the thickness through a pressing process. The positive electrode active material layer may be applied to the electrode with no current collector, or if necessary, the current collector may be attached to the obtained positive electrode active material layer to prepare the positive electrode including the current collector.

Figure 1B:
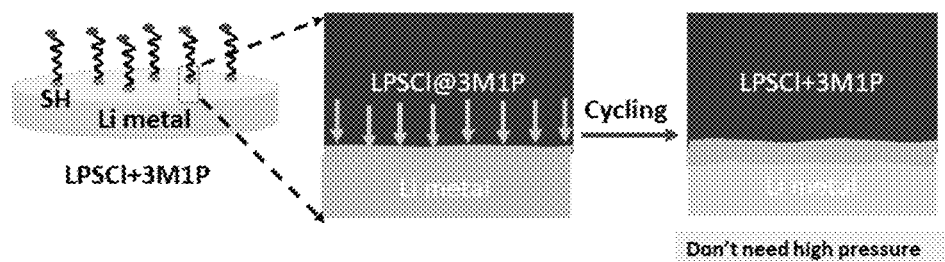
Figure 1C:
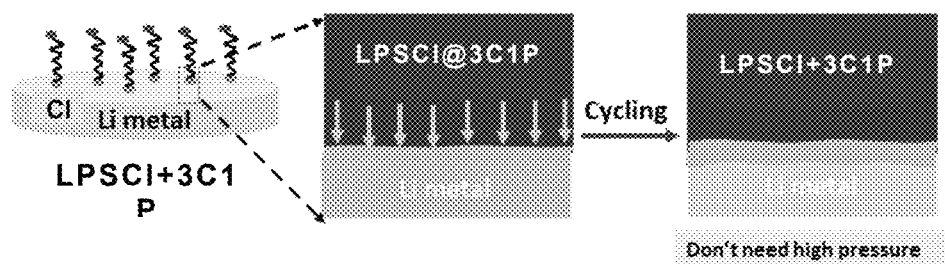

FIG. 1A shows a schematic illustration of lithium deposition for a conventional electrolyte comprising LPSCL. Specifically, argyrodite ($Li_6PS_5X$, where X=I, Cl and Br) is chemically/electrochemically unstable against metallic Li and tends to decompose into LiX (X=Cl, Br, I), $Li_2S$ and $Li_3P$ upon contact with Li metal. Additionally, the cell is prone to failure due to short circuits arising from ubiquitous penetration of lithium dendrites through the SSE during plating. Furthermore, the contact area can be lost due to void formation between the SSE and Li during stripping. In such circumstances, increasing stack pressure is widely used in an all-solid-state battery to ensure contact and minimize the interfacial impedance between the SSE and Li metal. However, this approach can dramatically increase the battery's footprint (e.g., by stacking components like springs) and production cost. Therefore, it is desirable for cells to operate at or below 5 MPa. FIG. 1B shows a schematic illustration of lithium deposition for an electrolyte comprising LPSCl and 3M1P according to one or more aspects of the disclosure. FIG. 1C shows a schematic illustration of lithium deposition for an electrolyte comprising LPSCl and 3C1P according to one or more aspects of the disclosure. As described herein, by using surface molecular engineering to deposit a compound of 3M1P or 3C1P onto the surface of the $Li_6PS_5Cl$ (LPSCl) electrolyte, e.g., using a ball-milling method, the resulting electrolyte avoids the need for high pressure during operation. That is, a compatible interface of electrolyte with Li metal is created, which inhibits Li dendritic growth and ultimately allows the battery to function even under low pressure operation (FIG. 1).

Lithium Ion Batteries Generally

A solid-state battery can receive a charge and discharge an electrical load various times. A solid-state battery includes electrodes, a cathode electrode and an anode electrode, and an electrolyte to allow lithium ions to travel between the electrodes. In contrast to conventional liquid electrolyte batteries, the solid-state battery does not include any flowable liquids.

Forming a circuit between the electrodes causes electricity to flow between the electrodes. During charging of the lithium ion rechargeable battery, lithium ions are emitted from the cathode electrode and are intercalated into an active material of the anode electrode. During charging of the lithium ion rechargeable battery, lithium ions are emitted from the anode electrode and are intercalated into an active material of the cathode electrode. As lithium ions reciprocate between the electrodes, they transfer energy.

Solid State Battery Configuration

The present disclosure provides a solid-state battery comprising a cathode electrode, an anode electrode, and a solid electrolyte layer intermediate the cathode electrode and the anode electrode. In some aspects, the solid electrolyte may function as both an electrolyte and a separator. While listed as exemplary, the solid-state battery does not require all of these components. For example, in some configurations, such as in an anodeless system, the anode electrode may be omitted. Alternatively, according to aspects of the disclosure, the anode electrode may comprise an anode material with a metal carbon composite, such as a silver-carbon blend or composite, where silver particles are complexed between amorphous and/or crystalline carbon particles. While silver is used as exemplary, other metals may be used, including for example, tin, silicon, zinc, or combinations thereof.

The solid-state battery can optionally comprise an additional layer or layers, such as, for example, a separator layer, a protective layer, an inhibitor layer, a solid electrolyte interface layer, or a combination thereof. For example, a protective layer may be incorporated between the electrodes and the solid electrolyte layer. This protective layer may comprise materials such as lithium phosphate, lithium titanate, or lithium lanthanum zirconium oxide (LLZO), which can help prevent undesirable side reactions at the electrode-electrolyte interface. The protective layer may also serve to mitigate dendrite formation, particularly on the anode side, thereby improving the overall cycle life and safety of the battery. A separator layer may also be included in some configurations of the solid-state battery. While traditional liquid electrolyte batteries often use porous polymer separators, solid state batteries may employ thin ceramic or glass-ceramic layers as separators. These separator layers can provide additional mechanical support to the battery structure while still allowing for efficient ion transport. Materials such as LLZO, LATP (lithium aluminum titanium phosphate), or LAGP (lithium aluminum germanium phosphate) may be used for this purpose. The separator layer may also be designed to have a gradient structure, with properties optimized for contact with both the cathode and anode materials.

An aspect of the present disclosure relates to a solid-state battery comprising a solid electrolyte material as an electrolyte. Specific examples of the solid-state battery include any type of primary battery, secondary battery, fuel cell, solar cell or capacitor such as a super capacitor. In particular, the battery is a lithium-ion secondary battery. Aspects of the disclosure here may be implemented in a secondary battery with various form factors or battery formats, including for example in a pouch-type battery, a cylindrical battery, or a prismatic battery. The ASSB may be used in various applications, including small household power storage devices, motorcycles, electric vehicles, hybrid electric vehicles, cell phones, laptops, portable devices, etc.

In addition, the present disclosure provides a battery module including the all-solid-state battery as a unit cell, a battery pack including the battery module, and a device including the battery pack as a power source. Specific examples of the device include, but are not limited to, a power tool powered by electric motor; electric cars including an electric vehicle (EV), a hybrid electric vehicle (HEV), a plug-in hybrid electric vehicle (PHEV) and the like; an electric motorcycle including an electric bike (E-bike) and an electric scooter (E-scooter); an electric golf cart; and a power storage system.

Cell Configuration

The solid-state battery may comprise a single cell. In other aspects, the solid-state battery can comprise multiple cells, such as, at least two cells, at least three cells, or at least four cells. Connecting the cells in series increases a voltage of the solid-state battery and connecting the cells in parallel increases an amp-hour capacity of the solid-state battery. In some embodiments, the solid-state battery may be configured with a combination of series and parallel connections to achieve desired voltage and capacity characteristics. For example, multiple cells may be arranged in groups, with cells within each group connected in parallel to increase capacity, and these groups then connected in series to increase voltage. This configuration, sometimes referred to as a series-parallel arrangement, allows for greater flexibility in battery design and can help optimize performance for specific applications. Additionally, the number and arrangement of cells may be adjusted to meet various form factor requirements.

Thickness of Cell

A thickness, $t_1$, of the cell can be about 100, 150, 200, 250, 300, 400, 500, 1,000 µm, 2,000 µm, or 5,000 µm. In embodiments, the thickness, $t_1$, of the cell may be within a range formed by selecting any two numbers listed in the immediately previous sentence, e.g., between about 100 µm and about 5,000 µm or about 100 µm and about 1,000 µm.

Cathode Electrode Generally

The cathode electrode is associated with one polarity (e.g., positive) of the solid-state battery. The cathode electrode is configured as a positive electrode during discharge of the solid-state battery. The cathode electrode is suitable for lithium ion diffusion between a current collector and the solid electrolyte layer. The cathode electrode is in electrical communication with the current collector. In embodiments, the cathode electrode is formed over and in direct contact with the current collector. In other embodiments, another functional layer may be interposed between the cathode electrode and the current collector.

Material for the Cathode Electrode

The cathode electrode may be capable of reversible intercalation and deintercalation of lithium ions. For example, the cathode electrode can comprise one or more of a cathode active material, a conductive carbon, a solid electrolyte material, a binder, the like, or combinations thereof. Optionally, the cathode electrode 102 may further comprise an additive, such as, for example, an oxidation stabilizing agent, a reduction stabilizing agent, a flame retardant, a heat stabilizer, an anti fogging agent, a thickener, the like, or a combination thereof. Examples of these additives may include butylated hydroxyanisole (BHA) or butylated hydroxytoluene (BHT) as oxidation stabilizing agents, ascorbic acid or sodium sulfite as reduction stabilizing agents, aluminum hydroxide or magnesium hydroxide as flame retardants, phenolic compounds or phosphites as heat stabilizers, polyethylene glycol or silica nanoparticles as antifogging agents, and carboxymethyl cellulose (CMC) or xanthan gum as thickeners.

Material for the Cathode Active Material

The cathode active material can include lithium cobalt oxide ($LiCoO_2$), lithium nickel oxide ($LiNiO_2$), $Li[Ni_aCo_bMncM^1{}_d]O_2$ (wherein $M^1$ is any one element elected from the group consisting of Al, Ga, In, or a combination thereof, $0.3 \leq a < 1.0$, $0 \leq b \leq 0.5$, $0 \leq c \leq 0.5$, $0 \leq d \leq 0.1$, and $a+b+c+d=1$), $Li(Li_eM^2{}_{f-e-f}M^3{}_{f'})O_{2-g}A_g$ (wherein $0 \leq e \leq 0.2$, $0.6 \leq f \leq 1$, $0 \leq f' \leq 0.2$, $0 \leq g \leq 0.2$, $M^2$ includes Mn and at least one element selected from the group consisting of Ni, Co, Fe, Cr, V, Cu, Zn and Ti, $M^3$ is at least one element selected from the group consisting of Al, Mg and B, and A is at least one element selected from the group consisting of P, F, S and N), or those compounds substituted with one or more transition metals; lithium manganese oxides such as those represented by the chemical formula of $Li^{1+h}Mn_{2-h}O_4$ (wherein $0 \leq h \leq 0.33$), $LiMnO_3$, $LiMn_2O_3$, $LiMnO_2$, or the like; lithium copper oxide ($Li_2CuO_2$); vanadium oxides such as $LiV_3O_8$, $V_2O_5$ or $Cu_2V_2O_7$; Ni-site type lithium nickel oxides represented by the chemical formula of $LiNi_{1-i}M^4{}_iO_2$ (wherein M4=Co, Mn, Al, Cu, Fe, Mg, B or Ga, and $0.01 \leq y \leq 0.3$); lithium manganese composite oxides represented by the chemical formula of $LiMn_{2-j}M^5{}_jO_2$ (wherein $M^5$=Co, Ni, Fe, Cr, Zn, or Ta, and $0.01 \leq y \leq 0.1$) or $Li_2Mn_3M^6O_8$ (wherein $M^6$=Fe, Co, Ni, Cu, or Zn); $LiMn_2O_4$ in which Li is partially substituted with an alkaline earth metal ion; disulfide compounds; $LiFe_3O_4$, $Fe_2(MoO_4)_3$; the like; or combinations thereof.

In addition to the cathode active materials previously mentioned, the cathode electrode may include other types of materials. For example, lithium iron phosphate ($LiFePO_4$) may be used as a cathode active material due to its excellent thermal stability and long cycle life. Other phosphate-based materials such as lithium manganese iron phosphate ($LiMn_xFe_{1-x}PO_4$) or lithium cobalt phosphate ($LiCoPO_4$) may also be suitable.

The cathode active material may also include layered oxide materials with various compositions, such as $Li(Ni_{1-x-y}Co_xMn_y)O_2$ (NCM) or $Li(Ni_{1-x-y}Co_xAl_y)O_2$ (NCA), where the ratios of Ni, Co, Mn, and Al can be adjusted to optimize performance characteristics. For instance, NCM materials with high nickel content, such as NCM811 ($LiNi_{0.8}Co_{0.1}Mn_{0.1}O_2$), may be used to achieve higher energy density. In some cases, the cathode active material may comprise spinel structures like $LiNi_{0.5}Mn_{1.5}O_4$, which can offer high voltage operation. Alternatively, materials with favorite structures, such as $LiFeSO_4F$ or $LiVPO_4F$, may be employed for their potential for high energy density and good thermal stability.

Composite or blended cathode materials, combining two or more active materials, may also be used. For example, a blend of layered oxides and spinel materials might be employed to balance energy density and power capability. As another example, lithium iron phosphate may be blended with one or more of the cathode active materials described above. In some embodiments, the cathode active material may include surface-modified versions of the aforementioned compounds, where the surface modification aims to improve stability, conductivity, or other performance metrics.

The cathode active material may also include emerging classes of materials such as disordered rock salt structures (e.g., $Li_3NbO_4$-based materials) or high-entropy oxides, which may offer unique combinations of high capacity and structural stability. In some cases, the cathode active material may incorporate dopants or substitutional elements to further tune its electrochemical properties.

Particulate Nature of the Cathode Active Material

The cathode active material can be particle shaped. The cathode active material can comprise a particle size of about 10 nm, 20 nm, 30 nm, 50 nm, 70 nm, 100 nm, 200 nm, 300 nm, 400 nm, 500 nm, 1,000 nm, 10 μm, 20 μm, 30 μm, 50 μm, 70 μm, 100 μm, 200 μm, 300 μm, 400 μm, 500 μm, or 1,000 μm. In embodiments, particle size of the cathode active material may be within a range formed by selecting any two numbers listed in the immediately previous sentence, e.g., between about 10 nm and about 1,000 μm. Gaps between cathode active material in the cathode electrode can be filled with the solid electrolyte material.

Amount of the Cathode Active Material in the Cathode Electrode

The amount of the cathode active material in the solid-state battery affects the charge and discharge capacity of the solid-state battery. In order to manufacture a high-capacity cathode electrode, a high level of cathode active material can be included in the cathode electrode. For example, the cathode electrode includes at, about, or greater than 30, 40, 50, 60, 70, 80, 90, 95, or 98 wt % of cathode active material based on the total weight of the cathode electrode. In embodiments, cathode active material in the cathode electrode may be within a range formed by selecting any two numbers listed in the immediately previous sentence, e.g., between about 40 wt % and about 98 wt %.

Material for the Conductive Material in the Cathode Electrode

The conductive material in the cathode electrode is not particularly limited, as long as it has conductivity while not causing any chemical change in the corresponding solid-state battery. For example, the conductive material can comprise graphite, such as natural graphite or artificial graphite; carbon black, such as acetylene black, ketjenblack, channel black, furnace black, lamp black or thermal black; conductive fibers, such as carbon fibers or metal fibers; carbon nanotubes (CNT), including both singled-walled carbon nanotubes (SWCNT) and multi-walled carbon nanotubes (MWCNT); metal powder, such as fluorocarbon, aluminum or nickel powder; conductive whiskers, such as zinc oxide or potassium titanate; conductive metal oxides, such as titanium oxide; conductive materials, such as polyphenylene derivatives; the like; or combinations thereof. Other conductive materials that may be used in the cathode electrode include graphene and its derivatives, such as reduced graphene oxide (rGO) or graphene nanoplatelets. These two-dimensional carbon materials offer high surface area and excellent electrical conductivity. Conductive polymers, such as polyaniline (PANI), polypyrrole (PPy), or poly(3,4-ethylenedioxythiophene) (PEDOT), may also be employed to enhance the electrode's conductivity while potentially improving its mechanical properties. In some cases, hybrid conductive additives combining different materials, such as CNT-graphene composites or metal-coated carbon materials, may be used to synergistically improve the overall conductivity and performance of the cathode electrode.

Amount of Conductive Material in the Cathode Electrode

The cathode electrode includes at or about 1, 2, 5, 10, 15, 20, 25, or 30 wt % of conductive material based on the total weight of the cathode electrode. In embodiments, conductive material in the cathode electrode may be within a range formed by selecting any two numbers listed in the immediately previous sentence, e.g., between about 1 wt % and about 30 wt %.

Material for the Binder

The binder can comprise various types of binder polymers, such as, for example, polyvinylidene fluoride-co-hexafluoropropylene (PVdF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, ethylene-propylene-diene monomer (EPDM), sulfonated EPDM, styrene butadiene rubber (SBR), fluororubber, polyacrylic acid, polymers thereof whose hydrogen atoms are substituted with Li, Na or Ca, various copolymers thereof, the like, or combinations thereof. In addition to the binder materials previously mentioned, other types of binder materials may be used in the cathode electrode to enhance its performance and stability. For instance, water-soluble binders such as sodium alginate, gelatin, or polyacrylamide may be employed to improve the environmental friendliness of the electrode manufacturing process. These binders may also offer advantages in terms of electrode flexibility and adhesion strength. In some cases, conductive binders like poly(3,4-ethylenedioxythiophene):poly(styrene sulfonate) (PEDOT:PSS) or polyaniline (PANI) may be used to simultaneously improve both the mechanical integrity and electrical conductivity of the electrode. Novel binder systems, such as self-healing polymers or supramolecular assemblies, may be incorporated to enhance the long-term stability and cycle life of the battery. Additionally, composite binders combining multiple polymers or incorporating inorganic nanoparticles may be utilized to tailor the mechanical, thermal, and electrochemical properties of the electrode. In some embodiments, bio-derived or biodegradable binders, such as cellulose derivatives or chitosan, may be employed to reduce the environmental impact of battery production and disposal.

Amount of Binder in the Cathode Electrode

The cathode electrode includes at or about 1, 2, 5, 10, 15, 20, 25, or 30 wt % of binder based on the total weight of the cathode electrode. In embodiments, binder in the cathode electrode may be within a range formed by selecting any two numbers listed in the immediately previous sentence, e.g., between about 1 wt % and about 30 wt %.

Material for Solid Electrolyte Material

The solid electrolyte material in the cathode electrode can be individually configured the same as the material for the solid electrolyte layer discussed below. The solid electrolyte material in the cathode electrode can be the same or different than the material for the solid electrolyte layer.

Amount of Solid Electrolyte Material in Cathode Electrode

The cathode electrode 102 includes about 1, 2, 5, 10, 15, 20, 25, or 30 wt % of solid electrolyte material based on the total weight of the cathode electrode. In embodiments, the amount of solid electrolyte material in the cathode electrode may be within a range formed by selecting any two numbers listed in the immediately previous sentence, e.g., between about 1 wt % and about 30 wt %.

Thickness of Cathode Electrode

A thickness, $t_2$, of the cathode electrode can be about 10, 20, 50, 100, 150, 200, 250, 300, 400, 500, or 1,000 μm. In embodiments, the thickness, $t_2$, of the cathode electrode may be within a range formed by selecting any two numbers listed in the immediately previous sentence, e.g., between about 10 μm and about 1,000 μm.

Porosity of Cathode Electrode

A porosity of the cathode electrode can be about 0, 1, 2, 3, 4, 5, 6, 7, 8, 9, 10, 11, 12, 13, 14, 15, 16, 17, or 18 vol % based on the total volume of the cathode electrode. In embodiments, the porosity of the cathode electrode may be within a range formed by selecting any two numbers listed in the immediately previous sentence, e.g., between 0 vol % and about 18 vol %.

Lithium Ion Diffusivity of the Cathode Electrode

The cathode electrode can include a lithium ion diffusivity of at or about $1\times10^{-14}$ cm$^2$/s, $1\times10^{-13}$ cm$^2$/s, $1\times10^{-12}$ cm$^2$/s, $1\times10^{-11}$ cm$^2$/s, $1\times10^{-10}$ cm$^2$/s, $1\times10^{-9}$ cm$^2$/s, $1\times10^{-8}$ cm$^2$/s, or $1\times10^{-7}$ cm$^2$/s. In embodiments, the lithium ion diffusivity of the cathode electrode may be within a range formed by selecting any two numbers listed in the immediately previous sentence, e.g., between $1\times10^{-14}$ cm$^2$/s and about $1\times10^{-7}$ cm$^2$/s.

Current Collector at the Cathode Electrode

The current collector collects electrical energy generated at the cathode electrode and supports the cathode electrode. The material of the current collector is not particularly limited as long as it allows adhesion of the cathode electrode, has a suitable electrical conductivity, and does not cause significant chemical changes in the corresponding solid-state battery in the voltage range of the solid-state battery. For example, the current collector is made of or includes various materials, such as, a metal, a conductive carbon, or a conductive ceramic, although not limited thereto. The metal of the current collector may include one or more selected from the group consisting aluminum, an aluminum alloy, copper, a copper alloy, nickel, a nickel alloy, titanium, a titanium alloy, iron, an iron alloy (e.g., steel, stainless steel), silver, a silver alloy, gold, platinum, palladium, chromium, molybdenum, tungsten, tantalum, niobium, zirconium, vanadium, manganese, cobalt, indium, tin, lead, bismuth, or a combination thereof, although not limited thereto.

Shape and Size of the Current Collector at the Cathode Electrode

It is possible to increase the adhesion of the cathode electrode to the current collector by forming fine surface irregularities on the surface of the current collector. The current collector may have various shapes, such as, for example, a film, a sheet, a foil, a net, a porous body, a foam, a non-woven web body, the like, or combinations thereof. The current collector may also be configured in various other geometries to optimize its performance and integration with the cathode electrode, and may be sized for specific form factors, such as pouch, cylindrical, and/or prismatic form factors. For instance, the current collector may be structured as a mesh or grid, which can provide enhanced mechanical support while maintaining high surface area for electrode adhesion. In some embodiments, the current collector may be designed with a corrugated or wavy pattern, potentially increasing the contact area with the cathode material and improving overall conductivity. The current collector may also be fabricated as a perforated sheet, allowing for better electrolyte penetration and ion transport. In certain cases, the current collector may be formed as a three-dimensional structure, such as an interconnected network of fibers or a honeycomb-like configuration, which could enhance the structural integrity of the electrode assembly while facilitating efficient current collection.

Thickness of Current Collector at the Cathode Electrode

A thickness, $t_3$, of the current collector can be about 3, 5, 10, 15, 20, 25, 50, 100, 150, 200, 300, 400, or 500 μm. In embodiments, the thickness, $t_3$, of the current collector 108 may be within a range formed by selecting any two numbers listed in the immediately previous sentence, e.g., between about 5 µm and about 500 µm.

Manufacturing Method for the Cathode Electrode

The cathode electrode may be obtained by various methods. For example, the cathode active material can be mixed and agitated with a solvent, and optionally a binder, conductive material, and a dispersing agent to form slurry. Then, the slurry can be applied (e.g., coated) onto the current collector, followed by pressing and drying, to obtain the cathode electrode.

In addition to the slurry-based method described, the cathode electrode may be manufactured using various other techniques. For instance, a dry powder coating process may be employed, where the cathode active material, conductive additives, and binder are mixed in a dry state and then directly applied to the current collector using electrostatic deposition or mechanical compression. This method may reduce environmental impact by eliminating the need for solvents.

In some cases, the cathode electrode may be fabricated using additive manufacturing techniques such as 3D printing. This approach allows for precise control over the electrode structure and porosity, potentially enhancing the electrode's performance and energy density. Various 3D printing methods, including fused deposition modeling (FDM), selective laser sintering (SLS), or direct ink writing (DIW), may be utilized depending on the specific materials and desired electrode properties.

Another method for manufacturing the cathode electrode may involve electrospinning. In this process, a solution containing the cathode active material, conductive additives, and a polymer binder is extruded through a nozzle under an electric field, resulting in the formation of nanofibers. These fibers can be collected directly on the current collector to form a highly porous electrode structure with increased surface area.

In some embodiments, the cathode electrode may be prepared using a tape casting method. This technique involves spreading a slurry of electrode materials onto a moving carrier film using a doctor blade, followed by drying and calendering. The resulting electrode tape can then be laminated onto the current collector.

Alternatively, the cathode electrode may be fabricated using a spray coating technique. In this method, a fine mist of the electrode slurry is sprayed onto the current collector using compressed air or ultrasonic atomization. This approach may allow for the creation of thin, uniform electrode layers and can be particularly useful for large-scale production.

In certain cases, the cathode electrode may be manufactured using a freeze-casting method. This process involves freezing a slurry of electrode materials, followed by sublimation of the ice to create a porous structure. The resulting porous electrode can then be sintered and attached to the current collector.

For some applications, the cathode electrode may be prepared using a sol-gel process. This method involves the formation of a colloidal suspension (sol) that is then converted into a gel-like network containing the cathode active material and other components. The gel can be applied to the current collector 108 and subsequently heat-treated to form the final electrode structure.

Application Methods for the Slurry for the Cathode Electrode

The application of the slurry to the cathode electrode may include using a technique selected from the group consisting of slot die coating, gravure coating, spin coating, spray coating, roll coating, curtain coating, extrusion, casting, screen printing, inkjet printing, screen printing, inkjet printing, spray printing, gravure printing, heat transfer printing, a Toppan printing method, intaglio printing, offset printing, the like, and combinations thereof. In some embodiments, the cathode electrode may be fabricated using a double layer slot die coating (DLD) technique. This method involves the simultaneous application of two distinct layers of electrode materials onto the current collector in a single pass. The DLD process may allow for the creation of gradient structures within the electrode, potentially optimizing both the electrochemical performance and mechanical properties of the cathode. Additionally, this technique may enable the incorporation of functional interlayers or protective coatings as part of the electrode manufacturing process, potentially enhancing the overall battery performance and longevity.

Solvent for the Slurry for the Cathode Electrode

The solvent for forming the cathode electrode may include water and/or an organic solvent, such as, for example, N-methyl pyrrolidone (NMP), dimethyl formamide (DMF), acetone, dimethyl acetamide, dimethyl sulfoxide (DMSO), isopropyl alcohol, the like, or combinations thereof. The solvent may be used in an amount sufficient to dissolve and disperse the electrode ingredients, such as the cathode active material, binder, and conductive material, considering the slurry coating thickness, production yield, the like, or combinations thereof. Additional solvents that may be used include ethanol, methanol, propanol, butanol, ethyl acetate, methyl ethyl ketone, tetrahydrofuran, diethyl ether, and toluene. In some aspects of the disclosure, the cathode electrode may be prepared using a solvent-free method, such as dry powder processing or melt extrusion, which eliminates the need for liquid solvents and may offer environmental and cost benefits.

Dispersing Agent for the Slurry for the Cathode Electrode

The dispersing agent forming the cathode electrode may include an aqueous dispersing agent and/or an organic dispersing agent, such as, for example, N-methyl-2-pyrrolidone. Other possible dispersing agents may include polyvinylpyrrolidone (PVP), carboxymethyl cellulose (CMC), sodium dodecyl sulfate (SDS), Triton X-100, polyethylene glycol (PEG), polyacrylic acid (PAA), and various surfactants such as polysorbates or poloxamers.

Drying Technique for the Cathode Electrode

The slurry for the cathode electrode may be dried by irradiating heat, electron beams (E-beams), gamma rays, or UV (G, H, I-line), the like, or combinations thereof, to vaporize the solvent. For example, the slurry may be vacuum dried at room temperature. Although the solvent is removed through evaporation by the drying step, the other ingredients do not evaporate and remain as they are to form the cathode electrode. In addition to the drying techniques mentioned, the cathode electrode may be dried using other methods such as infrared (IR) drying, microwave drying, or freeze-drying. In some embodiments, a combination of drying techniques may be employed, such as using convection heating followed by vacuum drying, to optimize the drying process and ensure complete solvent removal while maintaining the integrity of the electrode structure.

Anode Electrode Generally

The anode electrode is associated with one polarity (e.g., negative) of the solid-state battery, which is different than the polarity of the cathode electrode. The anode electrode is configured as a negative electrode during discharge of the solid-state battery. The anode electrode is suitable for lithium ion diffusion between a current collector and the solid electrolyte layer. The anode electrode is in electrical communication with the current collector. In embodiments, the anode electrode is formed over and in direct contact with the current collector. In some embodiments, as explained above, the solid-state battery may utilize an anodeless electrode system. In such configurations, the anode electrode may be omitted, and lithium metal may be deposited directly onto the current collector during charging. This approach may potentially increase the energy density of the battery by eliminating the need for a separate anode material, while also potentially reducing the overall thickness of the battery structure.

Material for the Anode Electrode

The anode electrode may be capable of reversible intercalation and deintercalation of lithium ions. For example, the anode electrode can comprise an anode active material, a binder, the like, or combinations thereof. Optionally, the anode electrode 104 may further comprise an additive, such as, for example, an oxidation stabilizing agent (e.g., butylated hydroxyanisole, butylated hydroxytoluene, propyl gallate, tert-butylhydroquinone), a reduction stabilizing agent (e.g., ascorbic acid, sodium sulfite, erythorbic acid, sodium metabisulfite), a flame retardant (e.g., aluminum hydroxide, magnesium hydroxide, ammonium polyphosphate, melamine cyanurate), a heat or light stabilizer (e.g., phenolic compounds, phosphites, hindered amine light stabilizers, UV absorbers like benzophenones or benzotriazoles), an anti fogging agent (e.g., polyethylene glycol, silica nanoparticles, glycerol, sorbitol), a thickener (e.g., carboxymethyl cellulose, xanthan gum), the like, or a combination thereof. Additionally, conductive additives such as carbon black, graphene, or carbon nanotubes may be incorporated to enhance electrical conductivity, while binder modifiers like styrene-butadiene rubber or polyacrylic acid may improve adhesion and mechanical stability. Functional additives such as fluoroethylene carbonate or vinylene carbonate may also be included to promote the formation of a stable solid electrolyte interphase layer on the anode surface.

Material for the Anode Active Material

The anode active material is made of or includes various materials, such as, for example, an alkali earth metal, an alkaline earth metal, a group 3B metal, a transition metal, a metalloid, an alloy thereof, a conductive carbon, the like, or a combination thereof, although not limited thereof. In embodiments, the anode active material can comprise silicon, a silicon alloy, lithium, a lithium alloy, a conductive carbon, or a combination thereof, although not limited thereto. In embodiments, the lithium alloy is made of or includes a lithium alloy comprising silicon, chlorine, or a combination thereof. The anode active material can include carbon-based material such as artificial graphite, natural graphite, graphitized carbon fiber, amorphous carbon or the like; a metallic compound capable of alloying with lithium such as Si, Al, Sn, Pb, Zn, Bi, In, Mg, Ga, Cd, a Si alloy, a Sn alloy, an Al alloy, or the like; a metal oxide capable of doping and dedoping lithium ions such as SiOx (0<x<2), $SnO_2$, vanadium oxide or lithium vanadium oxide; and a composite including the metallic compound and the carbon-based material such as a Si—C composite or a Sn—C composite. A lithium metal thin film may be used as the anode active material. The carbon-based material can include low-crystallinity carbon, high-crystallinity carbon, the like, or combinations thereof. A representative example of low-crystallinity carbon is soft carbon or hard carbon, and a representative example of the high-crystallinity carbon is high-temperature calcined carbon such as amorphous, platy, flaky, spherical or fibrous natural graphite or artificial graphite, kish graphite, pyrolytic carbon, mesophase pitch-based carbon fiber, meso-carbon microbeads, mesophase pitches, petroleum or coal tar pitch-derived coke, the like, or combinations thereof. In addition to the materials mentioned, the anode active material may also include titanium-based compounds such as lithium titanate ($Li_4Ti_5O_{12}$) or titanium dioxide ($TiO_2$), which can offer excellent cycling stability and high-rate capability. Other potential materials may include transition metal oxides like molybdenum oxides (MoOx), iron oxides (FeOx), or nickel oxides (NiOx), which can provide high theoretical capacities. In some cases, composite materials combining different active materials, such as silicon-graphite composites or tin-carbon composites, may be used to leverage the advantages of multiple materials while mitigating their individual limitations.

Dendrite Formation

When the anode electrode is made of or includes lithium or a lithium alloy, dendrites may form on the anode electrode. The dendrites are a metallic lithium structure formed when extra lithium ions accumulate on a surface of the anode electrode. The formed dendrites may damage the solid electrolyte layer, reduce battery capacity of the solid-state battery, and/or otherwise lead to undesired performance of the solid-state battery. Dendrite formation is a significant challenge in lithium-based batteries, as these structures can grow through the electrolyte, potentially causing short circuits and safety hazards. The growth rate and morphology of dendrites may be influenced by factors such as current density, temperature, and the nature of the electrolyte-electrode interface.

Solid electrolytes offer several advantages over liquid electrolytes when it comes to mitigating dendrite formation. The mechanical strength of solid electrolytes may help suppress dendrite growth by providing a physical barrier to lithium metal penetration. Additionally, the uniform ion distribution in solid electrolytes may promote more even lithium deposition, reducing the likelihood of localized dendrite nucleation. Some solid electrolytes may also form a stable interface with the lithium metal anode, further inhibiting dendrite formation. However, it is important to note that while solid electrolytes can significantly reduce the risk of dendrite growth, they may not completely eliminate it, and ongoing research aims to develop advanced solid electrolyte materials with enhanced dendrite suppression capabilities.

Nature of the Anode Active Material

The anode active material can be particle shaped or it may be a continuous, unitary form (e.g., a thin film or sheet). In embodiments where the anode active material is particle shaped, the anode active material can comprise a particle size of about 10 nm, 20 nm, 30 nm, 50 nm, 70 nm, 100 nm, 200 nm, 300 nm, 400 nm, 500 nm, 1,000 nm, 10 μm, 20 μm, 30 μm, 50 m, 70 μm, 100 μm, 200 μm, 300 μm, 400 μm, 500, or 1,000 μm. In embodiments, particle size of the anode active material may be within a range formed by selecting any two numbers listed in the immediately previous sentence, e.g., between about 10 nm and about 1,000 μm.

Amount of Anode Active Material in the Anode Electrode

The amount of the anode active material in the solid-state battery affects the charge and discharge capacity of the solid-state battery. In order to manufacture a high-capacity anode electrode, a high level of anode active material can be included in the anode electrode. For example, the anode electrode includes at, about, or greater than 70, 80, 90, 95, 98, 99, or 100 wt % of anode active material based on the total weight of the anode electrode. In embodiments, anode active material in the anode electrode may be within a range formed by selecting any two numbers listed in the immediately previous sentence, e.g., between about 70 wt % and about 100 wt %.

Material for Binder in the Anode Electrode

The binder can comprise various types of binder polymers, such as, for example, polyvinylidene fluoride-co-hexafluoropropylene (PVdF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, ethylene-propylene-diene monomer (EPDM), sulfonated EPDM, styrene butadiene rubber (SBR), fluororubber, polyacrylic acid, polymers thereof whose hydrogen atoms are substituted with Li, Na or Ca, various copolymers thereof, the like, or combinations thereof. In addition to the binders mentioned, other suitable binders for use in the anode electrode may include polyimide, polyamide-imide, polyurethane, polyethylene oxide (PEO), poly(ethylene-co-vinyl acetate) (PEVA), poly(vinyl acetate) (PVA), alginate, chitosan, guar gum, xanthan gum, carrageenan, pectin, gelatin, lignin, and various water-soluble polymers or their derivatives. In some cases, conductive polymers such as polypyrrole, polyaniline, or poly(3,4-ethylenedioxythiophene) (PEDOT) may also be used as binders to simultaneously improve adhesion and electrical conductivity within the anode electrode.

Amount of Binder in the Anode Electrode

The anode electrode can include at or about 0, 1, 2, 5, 10, 15, 20, 25, or 30 wt % of binder based on the total weight of the anode electrode. In embodiments, binder in the anode electrode may be within a range formed by selecting any two numbers listed in the immediately previous sentence, e.g., between about 0 wt % and about 30 wt %.

Thickness of the Anode Electrode

The anode electrode can be about 10, 20, 30, 50, 60, 70, or 100 μm thick. In embodiments, the thickness, $t_4$, of the anode electrode 104 may be within a range formed by selecting any two numbers listed in the immediately previous sentence, e.g., between about 10 μm and about 100 μm or about 10 μm and about 20 μm.

Porosity of Anode Electrode

A porosity of the anode electrode can be about 0, 1, 2, 3, 4, 5, 6, 7, 8, 9, 10, 11, 12, 13, 14, 15, 16, 17, or 18 vol % based on the total volume of the anode electrode. In embodiments, the porosity of the anode electrode may be within a range formed by selecting any two numbers listed in the immediately previous sentence, e.g., between 0 vol % and about 18 vol %.

Lithium Ion Diffusivity of the Anode Electrode

The anode electrode can include a lithium ion diffusivity of about $1\times10^{-14}$ cm$^2$/s, $1\times10^{-13}$ cm$^2$/s, $1\times10^{-12}$ cm$^2$/s, $1\times10^{-11}$ cm$^2$/s, $1\times10^{-10}$ cm$^2$/s, $1\times10^{-9}$ cm$^2$/s, $1\times10^{-8}$ cm$^2$/s, or $1\times10^{-7}$ cm$^2$/s. In embodiments, the lithium ion diffusivity of the anode electrode may be within a range formed by selecting any two numbers listed in the immediately previous sentence, e.g., between $1\times10^{-14}$ cm$^2$/s and about $1\times10^{-7}$ cm$^2$/s.

Current Collector at the Anode Electrode

The current collector collects electrical energy generated at the anode electrode 104 and supports the anode electrode. The material of the current collector is not particularly limited as long as it allows adhesion of the anode electrode, has a suitable electrical conductivity, and does not cause significant chemical changes in the corresponding solid-state battery in the voltage range of the solid-state battery. For example, the current collector is made of or includes a metal or a conductive carbon, although not limited thereto. The metal of the current collector may include one or more selected from the group consisting aluminum, an aluminum alloy, copper, a copper alloy, nickel, a nickel alloy, titanium, a titanium alloy, iron, an iron alloy (e.g., steel, stainless steel), silver, a silver alloy, or a combination thereof, although not limited thereto.

Shape and Size of the Current Collector at the Anode Electrode

It is possible to increase the adhesion of the anode electrode to the current collector by forming fine surface irregularities on the surface of the current collector. The current collector may have various shapes, such as, for example, a film, a sheet, a foil, a net, a porous body, a foam, a non-woven web body, the like, or combinations thereof. In addition to the shapes mentioned, the current collector may also be configured as a honeycomb structure, a perforated sheet, a woven or non-woven mesh, a sintered porous body, or a three-dimensional interconnected network. These various shapes can be tailored to optimize the surface area, mechanical strength, and current collection efficiency of the current collector. Furthermore, the current collector may be designed to accommodate different form factors of solid-state batteries, such as pouch cells, cylindrical cells, or prismatic cells, each offering unique advantages in terms of packaging efficiency, thermal management, and overall battery performance.

Thickness of Current Collector at the Anode Electrode

A thickness, $t_5$, of the current collector can be about 3, 5, 10, 15, 20, 25, 50, 100, 150, 200, 300, 400, or 500 μm. In embodiments, the thickness, $t_5$, of the current collector may be within a range formed by selecting any two numbers listed in the immediately previous sentence, e.g., between about 5 μm and about 500 μm.

Manufacturing Method for the Anode Electrode

The anode electrode may be obtained by various methods, such as, for example, atomic deposition, extrusion, rolling, a slurry method, or a combination thereof. For example, the anode active material can be mixed and agitated with a solvent, and optionally a binder, and a dispersing agent to form slurry. Then, the slurry can be applied (e.g., coated) onto the current collector, followed by pressing and drying, to obtain the anode electrode. In addition to the methods mentioned, the anode electrode may be manufactured using various other techniques, including dry electrode processes. These alternative methods may offer advantages in terms of environmental impact, cost-effectiveness, and scalability.

Dry powder coating may be employed as an alternative to the slurry method. In this process, the anode active material, conductive additives, and binder are mixed in a dry state and then directly applied to the current collector using electrostatic deposition or mechanical compression. This method eliminates the need for solvents, potentially reducing environmental impact and processing time.

Additive manufacturing techniques, such as 3D printing, may be used to fabricate the anode electrode. Various 3D printing methods, including fused deposition modeling (FDM), selective laser sintering (SLS), or direct ink writing (DIW), can be utilized depending on the specific materials and desired electrode properties. This approach allows for precise control over the electrode structure and porosity.

Electrospinning is another potential method for manufacturing the anode electrode. In this process, a solution containing the anode active material, conductive additives, and a polymer binder is extruded through a nozzle under an electric field, resulting in the formation of nanofibers. These fibers can be collected directly on the current collector to form a highly porous electrode structure with increased surface area.

Tape casting may be employed to prepare the anode electrode. This technique involves spreading a slurry of electrode materials onto a moving carrier film using a doctor blade, followed by drying and calendering. The resulting electrode tape can then be laminated onto the current collector.

Spray coating techniques may be used to fabricate the anode electrode. A fine mist of the electrode slurry is sprayed onto the current collector using compressed air or ultrasonic atomization. This approach may allow for the creation of thin, uniform electrode layers and can be particularly useful for large-scale production.

Freeze-casting is another potential method for manufacturing the anode electrode. This process involves freezing a slurry of electrode materials, followed by sublimation of the ice to create a porous structure. The resulting porous electrode can then be sintered and attached to the current collector.

In some cases, a sol-gel process may be used to prepare the anode electrode. This method involves the formation of a colloidal suspension (sol) that is then converted into a gel-like network containing the anode active material and other components. The gel can be applied to the current collector and subsequently heat-treated to form the final electrode structure.

For certain applications, physical vapor deposition (PVD) or chemical vapor deposition (CVD) techniques may be employed to create thin film anodes directly on the current collector. These methods can produce highly uniform and dense electrode layers, which may be particularly beneficial for certain types of solid-state batteries.

Lastly, mechanical alloying and high-energy ball milling may be used to prepare composite anode materials, which can then be pressed into electrodes or applied to the current collector using one of the aforementioned methods. This technique can be particularly useful for creating nanostructured or amorphous anode materials with enhanced electrochemical properties.

Ball Milling Generally

Ball milling is a valuable technique for mixing and preparing materials for solid-state batteries. Ball milling is a mechanical technique widely used to grind powders into fine particles and mix materials in various applications, including the preparation of solid-state battery components. In the context of solid-state batteries, ball milling is often employed to mix and blend the electrode materials, solid electrolytes, and other components. Exemplary ball milling devices may include planetary ball mills, attritor mills, and vibratory ball mills. These devices typically consist of a rotating or vibrating chamber containing grinding balls made of materials such as steel, ceramic, or zirconia.

Homogeneous Mixing

Ball milling is effective in achieving a homogeneous mixture of different powders. This is crucial for ensuring uniform distribution of components in the electrode materials and solid electrolytes, which, in turn, impacts the overall performance of the battery.

Reducing Particle Size

Ball milling can reduce the particle size of the materials involved, leading to increased surface area and improved reactivity. Smaller particle sizes can enhance the kinetics of electrochemical reactions, contributing to better battery performance.

Enhanced Electrode-Electrolyte Interface

Ball milling can facilitate the formation of a well-defined interface between the electrode and solid electrolyte. This is important for promoting efficient ion transport and minimizing interfacial resistance within the solid-state battery.

Promoting Solid-State Reactions

Ball milling can induce solid-state reactions between different components, promoting the formation of desired phases and structures in the materials. This is particularly relevant for the synthesis of composite electrode materials or preparation of the composite electrolyte materials provided herein.

Optimizing Conductivity

Ball milling can be used to optimize the conductivity of electrode materials by ensuring a good distribution of conductive additives, such as carbon or metal nanoparticles, within the composite; or the additive materials, within the solid electrolyte, as provided herein.

Controlling Morphology

The milling process can also influence the morphology of the materials, including particle shape and size distribution. Controlling these aspects is important for achieving the desired electrochemical properties and overall performance of the solid-state battery.

Energy Considerations

Ball milling is an energy-intensive process, and the duration and speed of milling need to be carefully controlled to avoid excessive heating, which could lead to undesired reactions or damage to the materials.

Application Methods for Slurry for Anode Electrode

The application of the slurry for the anode electrode may include using a technique selected from the group consisting of slot die coating, gravure coating, spin coating, spray coating, roll coating, curtain coating, extrusion, casting, screen printing, inkjet printing, screen printing, inkjet printing, spray printing, gravure printing, heat transfer printing, a Toppan printing method, intaglio printing, offset printing, the like, and combinations thereof. In addition to the aforementioned techniques, other methods for applying the anode slurry to the current collector may include doctor blade coating, dip coating, and meniscus coating. Double slot die layer coating may also be employed, which allows for the simultaneous application of two distinct layers of electrode materials onto the current collector in a single pass. This method can potentially enable the creation of gradient structures within the electrode, optimizing both electrochemical performance and mechanical properties.

Solvent for the Slurry for the Anode Electrode

The solvent for forming the anode electrode may include water and/or an organic solvent, such as, for example, N-methyl pyrrolidone (NMP), dimethyl formamide (DMF), acetone, dimethyl acetamide, dimethyl sulfoxide (DMSO), isopropyl alcohol, the like, or combinations thereof. The solvent may be used in an amount sufficient to dissolve and disperse the electrode ingredients, such as the anode active material and binder, considering the slurry coating thickness, production yield, the like, or combinations thereof. Additional organic solvents that may be used include ethanol, methanol, propanol, butanol, ethyl acetate, methyl ethyl ketone, tetrahydrofuran, diethyl ether, and toluene. In some embodiments, the anode electrode may be prepared using a solvent-free method, such as dry powder processing or melt extrusion, which eliminates the need for liquid solvents and may offer environmental and cost benefits.

Dispersing Agent for Slurry for the Anode Electrode

The dispersing agent forming the anode electrode may include an aqueous dispersing agent and/or an organic dispersing agent, such as, for example, N-methyl-2-pyrrolidone. The dispersing agent forming the anode electrode may include an aqueous dispersing agent and/or an organic dispersing agent, such as, for example, N-methyl-2-pyrrolidone. Other examples of aqueous dispersing agents may include sodium dodecyl sulfate (SDS), polyvinylpyrrolidone (PVP), and carboxymethyl cellulose (CMC), while additional organic dispersing agents may include Triton X-100, polyethylene glycol (PEG), and various surfactants such as polysorbates or poloxamers. In some embodiments, the anode electrode 104 may be prepared using methods that do not require a dispersing agent, such as dry powder processing or certain additive manufacturing techniques.

Drying Technique for the Anode Electrode

The slurry for the anode electrode may be dried by irradiating heat, electron beams (E-beams), gamma rays, or UV (G, H, I-line), the like, or combinations thereof, to vaporize the solvent. For example, the slurry may be vacuum dried at room temperature. Although the solvent is removed through evaporation by the drying step, the other ingredients do not evaporate and remain as they are to form the anode electrode 104. In addition to the drying techniques mentioned, several other methods may be employed to dry the anode electrode slurry. These additional techniques can offer various advantages depending on the specific materials, production requirements, and desired electrode properties.

Infrared (IR) drying may be used to rapidly heat the electrode surface, promoting efficient solvent evaporation. This method can be particularly effective for thin electrode coatings and may allow for precise control of the drying process. Microwave drying is another option that can provide volumetric heating of the electrode material, potentially leading to more uniform drying throughout the electrode thickness. In some cases, a combination of convection and microwave drying may be employed to optimize both drying speed and uniformity.

Freeze-drying, also known as lyophilization, may be utilized for certain electrode formulations. This process involves freezing the slurry and then sublimating the solvent under vacuum conditions. Freeze-drying can help maintain the porous structure of the electrode, which may be beneficial for electrolyte penetration and ion transport.

Supercritical $CO_2$ drying is an advanced technique that may be employed for specialized electrode materials. This method involves replacing the solvent with liquid $CO_2$, which is then brought to its supercritical state and vented. This approach can help preserve delicate nanostructures within the electrode and may be particularly useful for aerogel-based electrodes.

In some cases, a two-step drying process may be employed. For example, initial drying may be performed at a lower temperature to remove bulk solvent, followed by a higher temperature step to remove residual solvent and potentially initiate any desired chemical reactions within the electrode material.

Ultrasonic drying may also be considered for certain electrode formulations. This technique uses high-frequency sound waves to agitate the solvent molecules, potentially accelerating the drying process and improving solvent removal from porous structures within the electrode.

Solid Electrolyte Layer Generally

The solid electrolyte layer is suitable for lithium ion diffusion between the cathode electrode and the anode electrode. The solid electrolyte layer provides an electrically conductive pathway for the movement of charge carriers between the cathode electrode and the anode electrode. The solid electrolyte layer is in electrical communication with the cathode electrode and the anode electrode. In embodiments, the solid electrolyte layer is formed over and in direct contact with the cathode electrode or the anode electrode. In embodiments, the solid electrolyte layer is in direct contact with the cathode electrode and the anode electrode. In other embodiments, another functional layer may be interposed between the solid electrolyte layer and the cathode electrode and/or the anode electrode.

The solid electrolyte layer may have a gradient structure, with composition or properties that vary across its thickness to optimize ion transport and interfacial compatibility. For example, the layer could have higher ionic conductivity near the electrodes and higher mechanical strength in the middle.

In some embodiments, the solid electrolyte layer may be formed as a composite, incorporating both ceramic and polymer components to balance mechanical properties and ion conductivity. The ceramic component could provide structural stability while the polymer enhances flexibility and electrode contact.

The solid electrolyte layer may include engineered porosity or channels to facilitate ion transport while maintaining mechanical integrity. These could be created through techniques like freeze-casting or templating.

In certain configurations, the solid electrolyte layer may be applied as multiple thin sublayers with slightly different compositions or properties, allowing for fine-tuning of the overall layer characteristics.

The interface between the solid electrolyte and electrodes may be modified through surface treatments or the addition of buffer layers to improve adhesion and reduce interfacial resistance. This could involve plasma treatment, chemical modification, or deposition of nanoscale interface layers.

In some embodiments, the solid electrolyte layer may incorporate self-healing properties, such as the inclusion of microcapsules containing electrolyte material that can repair small cracks or defects that form during cycling.

The solid electrolyte layer may be designed with anisotropic properties, having different ionic conductivities in different directions to optimize ion transport between electrodes while minimizing unwanted side reactions.

In certain configurations, the solid electrolyte layer may include embedded current collectors or conductive networks to enhance charge transport and distribution across the battery structure.

The solid electrolyte layer may be formulated to have temperature-dependent properties, optimizing performance across a wide range of operating conditions. This could involve phase-change materials or components with different thermal expansion coefficients.

In some embodiments, the solid electrolyte layer may be designed to be pressure-sensitive, with ionic conductivity that improves under moderate compression to enhance performance during battery operation.

Material for Solid Electrolyte Layer

The solid electrolyte layer may be capable of transport of lithium ions. The material of the solid electrolyte layer is not particularly limited as long as it allows adhesion with adjacent layers, has a suitable electrical conductivity, and does not cause significant chemical changes in the corresponding solid-state battery in the voltage range of the solid-state battery. For example, besides the composite solid electrolyte materials including the additive material and the sulfide containing solid electrolyte material provided herein, the solid electrolyte layer may include various inorganic solid electrolytes, polymer solid electrolytes, polymer gel electrolytes, although not limited thereto. Additionally or alternatively, the solid electrolyte layer may include ceramic electrolytes, glass electrolytes, hybrid organic-inorganic electrolytes, and nanostructured electrolytes, although not limited to these categories.

Inorganic Solid Electrolyte

The inorganic solid electrolyte may include a crystalline solid electrolyte, a non-crystalline solid electrolyte, a glass ceramic solid electrolyte, the like, or a combination thereof, although not limited thereto. The inorganic solid electrolyte may be sulfide-based, oxide-based, the like, or a combination thereof. In addition to sulfide-based and oxide-based inorganic solid electrolytes, other types of inorganic solid electrolytes may include halide-based electrolytes, nitride-based electrolytes, and borate-based electrolytes. For example, lithium-rich anti-perovskites (LiRAP) such as Li3OCl and Li3OBr, lithium nitride (Li3N), and lithium borohydride (LiBH4) have been investigated as potential solid electrolyte materials for lithium-ion batteries.

Sulfide Based Solid Electrolyte

As provided herein, the sulfide-based solid electrolyte includes sulfur (S) and has ionic conductivity of metal belonging to Group I or Group II of the periodic table, and may include Li—P—S-based glass or Li—P—S-based glass ceramics. For example, the sulfide-based solid electrolyte may include lithium sulfide, silicon sulfide, germanium sulfide and boron sulfide. Particular examples of the inorganic solid electrolyte may include $Li_{3.833}Sn_{0.833}As_{0.166}S_4$, $Li_4SnS_4$, $Li_{3.25}Ge_{0.25}P_{0.75}S_4$, $Li_2S$—$P_2S_0$, $B_2S_3$—$Li_2S$, $XLi_2S$-$(100-x)P_2S_5$(x=70-80), $Li_2S$—$SiS_2$—$Li_3N$, $Li_2S$—$P_2S_5$—LiI, $Li_2S$—$SiS_2$—LiI, $Li_2S$—$B_2S_3$—LiI, $Li_3N$, LISICON, LIPON ($Li_{3+y}PO_{4-x}N_x$), thio-LISICON ($Li_{3.25}Ge_{0.25}P_{0.75}S_4$), $Li_2O$—$Al_2O_3$—$TiO_2$—$P_2O_5$(LATP), $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_{10}GeP_2S_{12}$ (LGPS), $Li_7P_3S_{11}$, $Li_6PS_5Cl$, $Li_6PS_5Br$, $Li_6PS_5I$, $Li_{9.54}Si_{1.74}P_{1.44}S_{11.7}Cl_{0.3}$, $Li_{11}Si_2PS_{12}$, the like, or combinations thereof. In some cases, doped variants of these materials, such as Al-doped $Li_{10}GeP_2Si_2$ or Sb-doped $Li_6PS_5Cl$, may also be employed to further enhance ionic conductivity or stability.

Oxide Based Solid Electrolyte

The oxide-based solid electrolyte material contains oxygen (O) and has ionic conductivity of metal belonging to Group I or II of the periodic table. The oxide-based solid electrolyte material may include at least one selected from the group consisting of LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAl_1O_8$, LAGP-based compounds, LATP-based compounds, $Li_{1+x}Ti_{2-x}Al_xSi_y(PO_4)_{3-y}$ (0≤x≤1, 0≤y≤1), $LiAl_xZr_{2-x}(PO_4)_3$ (0≤x≤1, 0≤y≤1), $LiTi_xZr_{2-x}(PO_4)_3$(0≤x≤1, 0≤y≤1), LISICON-based compounds, LIPON-based compounds, perovskite-based compounds, NASICON-based compounds and LLZO-based or derived compounds (such as Al-doped $Li_7La_3Zr_2O_{12}$ and Ta-doped $Li_7La_3Zr_2O_{12}$). Lithium-rich anti-perovskites like $Li_3OCl$ and $Li_3OBr$ have also been investigated as potential oxide-based solid electrolytes. In some cases, composite oxide electrolytes combining multiple oxide materials, such as LLZO-LATP composites, may be employed to leverage the advantages of different oxide systems.

Polymer Solid Electrolyte

The polymer solid electrolyte is a composite of electrolyte salt with polymer resin and has lithium ion conductivity. The polymer solid electrolyte may include a polyether polymer, a polycarbonate polymer, an acrylate polymer, a polysiloxane polymer, a phosphazene polymer, a polyethylene derivative, an alkylene oxide derivative, a phosphate polymer, a polyagitation lysine, a polyester sulfide, a polyvinyl alcohol, a polyvinylidene fluoride, a polymer containing an ionically dissociable group, poly(ethylene imine) (PEI), poly(methyl methacrylate) (PMMA), poly(acrylonitrile) (PAN), poly(ethylene succinate) (PES), biopolymers such as chitosan and cellulose derivatives, the like, or combinations thereof. The solid polymer electrolyte may include a polymer resin, such as a branched copolymer including polyethylene oxide (PEO) backbone copolymerized with a comonomer including an amorphous polymer, such as, for example, PMMA, polycarbonate, polydiloxane (pdms) and/or phosphazene, comb-like polymer, crosslinked polymer resin, polyethylene glycol (PEG), polypropylene oxide (PPO), polyacrylonitrile (PAN), poly(methyl methacrylate) (PMMA), poly(vinylidene fluoride-co-hexafluoropropylene) (PVDF-HFP), poly(ethylene oxide-co-propylene oxide) (PEO-PPO), poly(ethylene imine) (PEI), poly(vinyl pyrrolidone) (PVP), poly(vinyl alcohol) (PVA), various block copolymers or graft copolymers incorporating these materials, the like, or combinations thereof.

Polymer Gel Electrolyte

The polymer gel electrolyte can be formed by incorporating an organic electrolyte containing an organic solvent and an electrolyte salt, an ionic liquid, monomer, or oligomer to a polymer resin, the like, or combinations thereof. The polymer resin for the polymer gel can include polyether polymers, PVC polymers, PMMA polymers, polyacrylonitrile (PAN), polyvinylidene fluoride (PVDF), poly(vinylidene fluoride-co-hexafluoropropylene; PVDF-co-HFP), the like, or combinations thereof.

Examples of polymer gel electrolytes that may be suitable for solid state batteries include poly(ethylene oxide) (PEO), poly(methyl methacrylate-co-ethyl acrylate) (PMMA-EA), poly(acrylonitrile-co-methyl methacrylate) (PAN-MMA), poly(vinyl acetate) (PVAc), poly(ethylene glycol diacrylate) (PEGDA), poly(vinyl pyrrolidone) (PVP), poly(ethylene glycol methyl ether acrylate) (PEGMEA), poly(ethylene glycol methyl ether methacrylate) (PEGMEMA), poly(ionic liquid) (PIL), poly(ethylene glycol-co-propylene glycol) (PEG-PPG), poly(vinyl alcohol-co-ethylene) (PVA-PE), poly(acrylamide) (PAM), poly(2-hydroxyethyl methacrylate) (PHEMA), poly(ethylene glycol-co-polyethylene oxide) (PEG-PEO), and poly(methacrylic acid) (PMAA) based gel electrolytes to optimize the electrochemical and physical properties of the solid electrolyte.

Electrolyte Salt

The electrolyte salt is an ionizable lithium salt and may be represented by $Li^+ X^-$. $X^-$ may include an anion selected from the group consisting of at least one selected from the group consisting of $F^-$, $Cl^-$, $Br^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH$, $CF_3(CF_2)_7SO_3^-$, $CF_3CO_2^-$, $CH_3CO_2^-$, $SCN^-$, $(CF_3CF_2SO_2)_2N^-$, and the like. For example, the lithium salt may be any one selected from the group consisting of LiTFSI, LiCl, LiBr, LiI, $LiClO_4$, lithium tetrafluoroborate ($LiBF_4$), $LiB_{10}Cl_{10}$, lithium hexafluorophosphate ($LiPF_6$), $LiAsF_6$, $LiSbF_6$, $LiAlCl_4$, LiSCN, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2)\cdot 2NLi$, lithium chloroborate, lithium lower aliphatic carboxylate, lithium imide 4-phenylborate, lithium bis(oxalato)borate (LiBOB), lithium difluoro (oxalato)borate (LiDFOB), lithium bis(fluorosulfonyl)imide (LiFSI), lithium 4,5-dicyano-2-(trifluoromethyl)imidazolide (LiTDI), lithium bis(trifluoromethanesulfonyl)imide (LiTFSI), and lithium bis(fluorosulfonyl)imide (LiFSI), the like, and combinations thereof. The electrolyte salt can include any combination of the salts described herein.

Amount of Electrolyte Salt

The solid electrolyte layer 106 can include at or about 0, 50, 60, 70, 80, 100, 200, 300, or 400 parts of electrolyte salt, if present, based on the total weight of the solid electrolyte layer. In embodiments, electrolyte salt in the solid electrolyte layer may be within a range formed by selecting any two numbers listed in the immediately previous sentence, e.g., between about 0 parts and about 400 parts, or about 60 parts and 400 parts based on the total weight of the solid electrolyte layer.

Ion Conductivity of the Solid Electrolyte Layer

The solid electrolyte layer can include a suitable reduction stability and/or ion conductivity. Since the solid electrolyte layer mainly functions to transport lithium ions between electrodes, the solid electrolyte layer can include a desirable ion conductivity of at, about, or greater than, $10^{-7}$ S/cm, $10^{-6}$ S/cm, $10^{-5}$ S/cm, or $10^{-4}$ S/cm.

Thickness of the Solid Electrolyte Layer

A thickness, $t_6$, of the solid electrolyte layer can be about 3, 5, 10, 15, 20, 25, 30, 50, 70, 100, 150, 200, 300, 400, 500, or 1,000 µm. In embodiments, the thickness, $t_6$, of the solid electrolyte layer may be within a range formed by selecting any two numbers listed in the immediately previous sentence, e.g., between about 5 µm and about 1,000 µm, about 30 µm and about 100 µm, or about 30 µm and about 50 µm.

Unfinished Product

The cell can be provided as an unfinished product. In embodiments, the cell is stored, transported, and/or delivered to a reseller, customer, or the like that finishes manufacture of a battery assembly or product comprising the cell. In other embodiments, the cell is a finished battery assembly or product.

Seal the Battery

An enclosure of the solid-state battery can be sealed to finish making the solid-state battery such that it will work as a battery. The sealing process may involve various techniques to ensure the internal components are protected from external environmental factors and to maintain the integrity of the battery structure. For example, the enclosure may be hermetically sealed using methods such as laser welding, ultrasonic welding, or adhesive bonding. In some cases, the sealing process may also include the introduction of a protective atmosphere or the removal of air to create a vacuum within the enclosure. This sealing step may be helpful for preventing moisture ingress, which could potentially degrade the performance of the sulfide-based solid electrolyte. Additionally, the sealing process may incorporate safety features such as pressure relief mechanisms to manage any potential gas build-up during battery operation. Once properly sealed, the solid-state battery is ready for final quality control checks, which may include electrical testing, leak detection, and visual inspections. After passing these checks, the solid-state battery could be packaged and sold as a finished product, ready for integration into various electronic devices, electric vehicles, energy storage systems, and so forth.

Battery Configured

The solid-state battery is provided in various configurations to suit different applications and device requirements. In some aspects, the battery may be manufactured in a cylindrical form, which can be advantageous for certain types of portable electronics or automotive applications. Alternatively, the solid-state battery may be produced in a prismatic form, which can allow for more efficient space utilization in devices with rectangular form factors. In other cases, a pouch form may be employed, offering flexibility in shape and potentially reducing overall battery weight. The pouch form may further be especially suitable for solid state batteries due to easier application and control of uniform pressures within the battery. The choice of configuration may depend on factors such as the intended use, space constraints, thermal management requirements, and manufacturing considerations. In some embodiments, hybrid or custom configurations combining elements of different forms may be utilized to meet specific design needs. The versatility in battery form factors can enable the integration of solid-state batteries into a wide range of products, from small wearable devices to large-scale energy storage systems.

Voltage

The solid-state battery is configured to output a voltage of at or about 1, 2, 3, 4, 5, 6, 10, 12, 20, 24, 30, 40, 48, 50, 60, 70, 80, 90, 96, 100, 200, 300, 400, or 500 V DC. In embodiments, the output voltage of the solid-state battery may be within a range formed by selecting any two numbers listed in the immediately previous sentence, e.g., between about 1 V DC and about 500 V DC.

Capacity

The solid-state battery is configured to have a specific capacity of at, about, or greater than 100, 110, 120, 130, 140, 150, 160, 170, 180, 190, 200, or 300 mAh/g. In embodiments, the output voltage of the solid-state battery 100 may have a capacity formed by selecting any two numbers listed in the immediately previous sentence, e.g., between about 100 mAh/g and about 300 mAh/g.

Volume Expansion Calculation

The solid-state battery can include a desirable volume expansion rate. The volume expansion rate may be calculated from an increased amount of thickness after a first cycle of charging and discharging compared to an initial thickness. The volume expansion rate means a ratio of an amount of change in a thickness increased after a first cycle of charging and discharging to an initial thickness of a particular element. A first cycle of charging and discharging is performed by CC-CV charging a battery at 0.1 C and cutting off at 4.25 to 4.4 V and 0.02 C, and CC discharging the battery at 0.1 C and cutting off at 3 V. The volume expansion rate is calculated by Equation 1 below in which A may represent a thickness before charging and discharging and B may represent a thickness after charging and discharging. The thickness may be measured using a Mauser micrometer or a scanning electron microscope (SEM).

$$\text{Volume expansion rate} = [(B-A)/A] \times 100 \, C\text{-Rate} \quad \text{Equation 1}$$

C-rate as used herein refers to the rate at which the battery is discharged relative to its maximum capacity. For example, a 1C rate means the discharge current will discharge the entire battery within one hour. That is, for a battery with a capacity of 20 Amp-hrs, a discharge current at a 1C would be 20 Amps.

Other exemplary ways to measure and calculate the volume expansion rate for a solid-state battery may include using volumetric expansion measurement (e.g., gas pycnometry), in-situ dilatometry, X-ray tomography, strain gauge measurements, optical methods (e.g., digital image correlation or laser interferometry), pressure-based methods, and electrochemical strain microscopy.

EXAMPLES

The following examples are not intended to be limiting. The above disclosure provides many different aspects for implementing the features of the disclosure, and the following examples describe certain aspects. It will be appreciated that other modifications and methods known to one of ordinary skill in the art can also be applied to the following experimental procedures, without departing from the scope of the disclosure.

Experimental Example 1

An all-solid-state cell was prepared using 3M1P as an additive in a $Li_6PS_5Cl$ (LPSCl) solid oxide electrolyte. The 3M1P compound as a powder was deposited onto the surface of the LPSCl electrolyte using a ball-milling method for 30 minutes under room temperature.

Figure 5A:
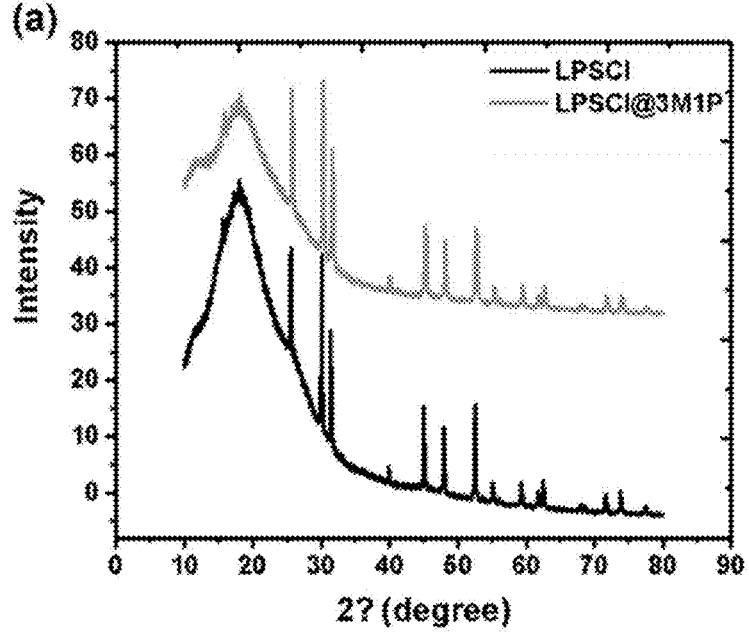
FIG. 5A shows an XRD pattern of an electrolyte comprising LPSCl (lower curve) and an electrolyte comprising LPSCl and 3M1P (upper curve).
Figure 5B:
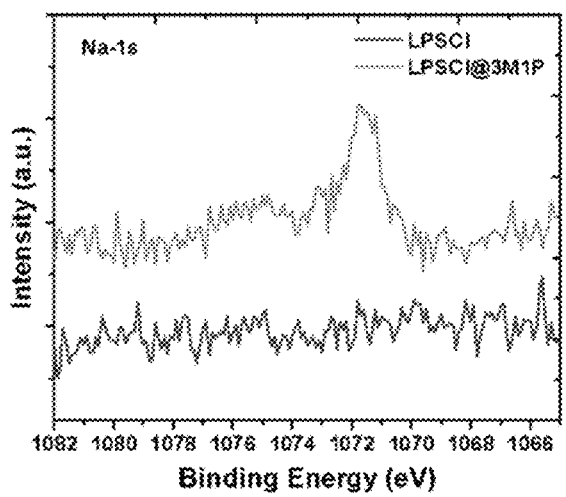
FIG. 5B shows the Na is spectra.
Figure 5C:
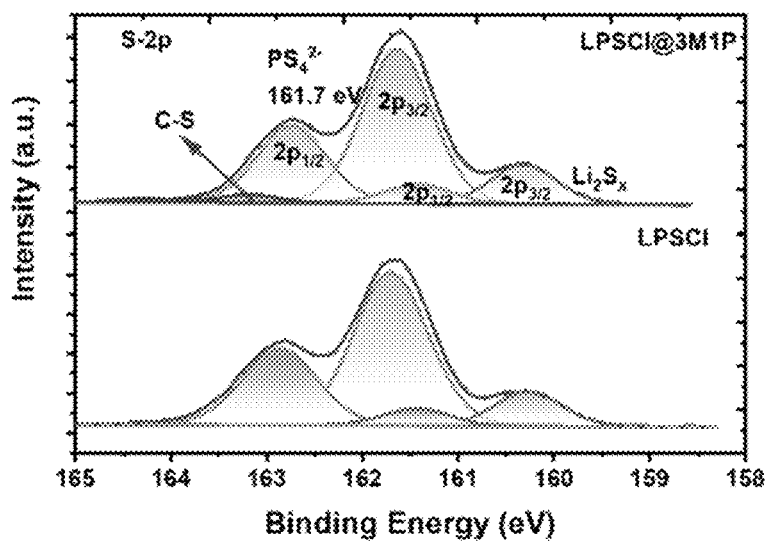
FIG. 5C shows the S 2p spectra, respectively, on the surface of an electrolyte comprising LPSCl (lower curve) and an electrolyte comprising LPSCl and 3M1P (upper curve).

FIG. 5A shows an XRD pattern of an electrolyte comprising LPSCl (lower curve) and an electrolyte comprising LPSCl and 3M1P (upper curve). FIG. 5B shows the Na 1s, and FIG. 5C shows the S 2p spectra on the surface of LPSCl and LPSCl+3M1P for an electrolyte comprising LPSCl and an electrolyte comprising LPSCl and 3M1P. FIG. 5A displays the XRD patterns of LPSCl and LPSCl+3M1P, in which all the major diffraction peaks were well matched with the standard argyrodite structure. Concurrently, we utilized XPS to further investigate the chemical compatibility between 3M1P and LPSCl. A new peak of Na signal is evident in LPSCl+3M1P, as shown in FIG. 5B. The S 2p spectra (FIG. 5C) of LPSCl+3M1P shows a signal corresponding to the bond of C—S, consistent with the structure of 3M1P containing Na and S, indicating the successful coating. Additionally, a distinct ortho-thiophosphate ($PS_4^{3-}$) signal is present in both electrolytes.

The modified LPSCl powder (e.g., which included a coating formed from the 3M1P additive (sodium 3-mercapto-1-propanesulfonate); referred to as "LPSCl+3M1P") was added into a cell and further pressed into pellet shape with a diameter of 12 mm under 370 MPa. Then Li foils were attached to both sides of the pellet to form the Li||LPSCl||Li, and Li||LPSCl+3M1P||Li cells. Finally, the sandwich cell was pressed under 30 MPa and low pressure. The assembled symmetric cells were tested with a different current density and time using LAND potentiostat to confirm the critical current density and cycling performance.

Figure 6A:
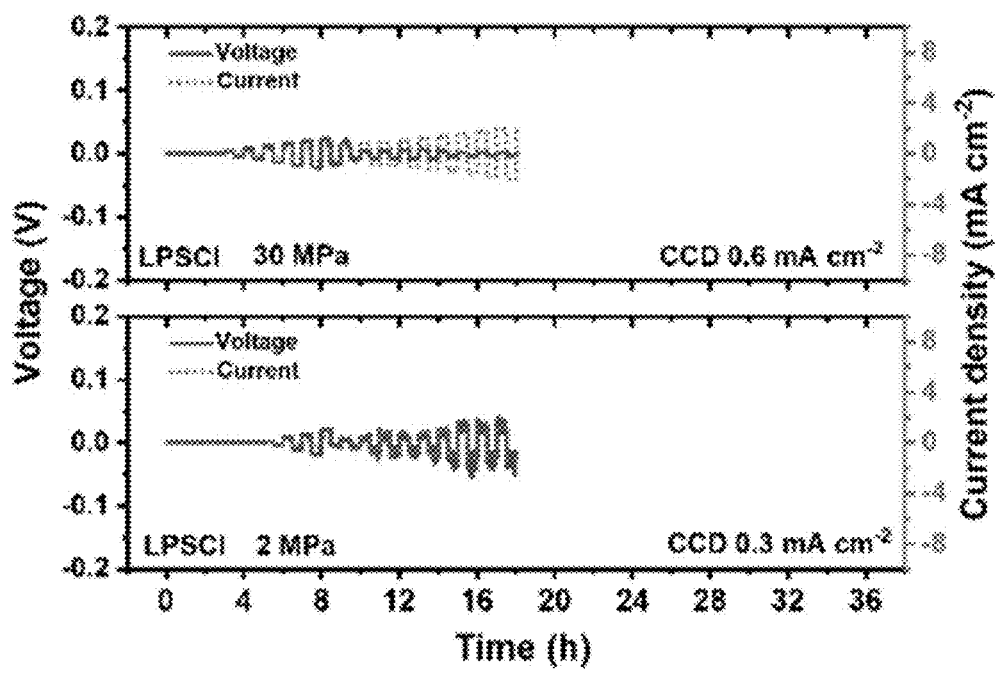
FIG. 6A shows the critical current density (CCD) of a symmetric Li|LPSCl|Li cell and FIG. 6B shows the critical current density (CCD) of a symmetric Li|LPSCl+3M1P|Li, respectively, each at stack pressures of 30 MPa and 2 MPa.
Figure 6B:
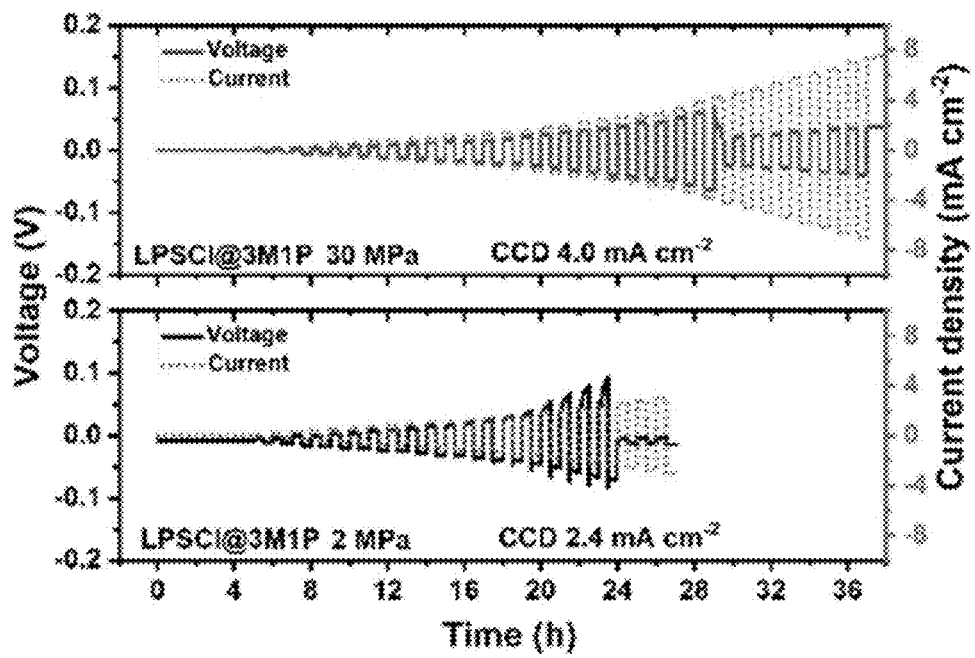

FIG. 6A shows the critical current density (CCD) of a symmetric Li|LPSCl|Li cell, and FIG. 6B shows the critical current density (CCD) of a symmetric Li|LPSCl+3M1P|Li, respectively, each at stack pressures of 30 MPa and 2 MPa. FIG. 6 illustrates the performance Li|LPSCl or LPSCl+3M1P|Li symmetric cells using LPSC and LPSCl+3M1P electrolytes at various stack pressures. We can conclude that the 3M1P organic compound demonstrates an impressive increase in CCD, reaching 4.0 and 2.4 mA cm$^{-2}$ at stack pressures of 30 MPa and 2 MPa, respectively.

Experimental Example 2

To evaluate symmetric and the full cell's electrochemical performances, ASSB (all solid state battery) with a diameter of 13 mm, composed of polyaryletheretherketone (PEEK) mold and Ti rods were assembled. 240 mg of LPSC or LPSC+3M1P pressed under 375 MPa were used as electrolyte. The cathode composite was made by mixing NCM811 (LG Energy Solution)-LPSC (Ampcera Inc, used as received)-vapor grown carbon fiber (Sigma Aldrich) in the weight ratio of 64:33:3 in a mortar and pestle, with loading of 4 mg/cm$^2$. The cathode and electrolyte layers were pressed to 375 MPa, while the Li as anode was pressed to 30 MPa. All cells were assembled in an argon atmosphere glovebox. Cell measurements were made on a LAND multi-channel battery testing system. The galvanostatic charge-discharge tests of full cells were conducted within the voltage range of 2.5-4.25 V at a rate of 0.1C under 60° C.

Figure 7A:
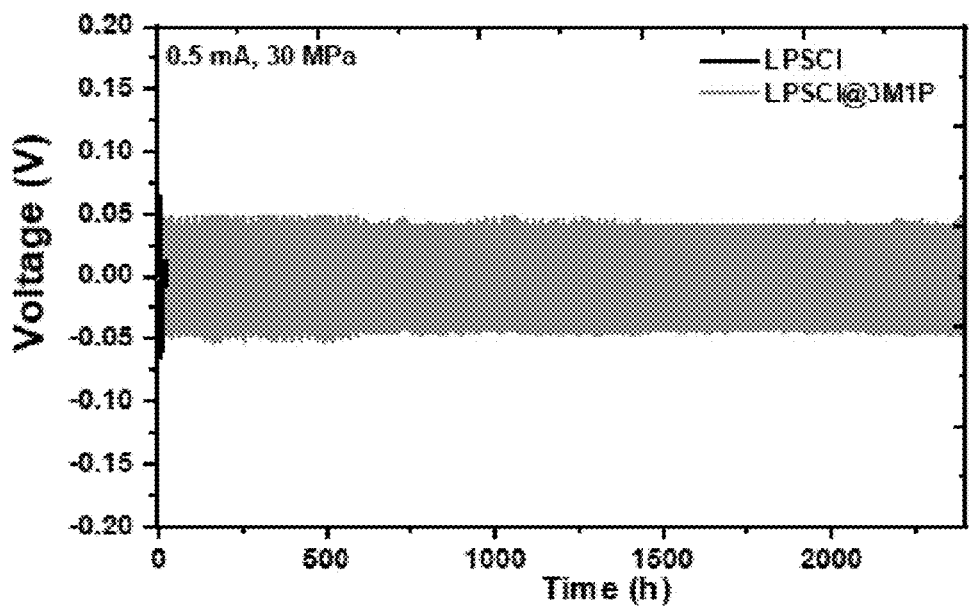
FIG. 7A and FIG. 7C show long term cycling stability of LPSCl and LPSCl+3M1P, respectively, in symmetric cells at various stack pressures and current densities.
Figure 7B:
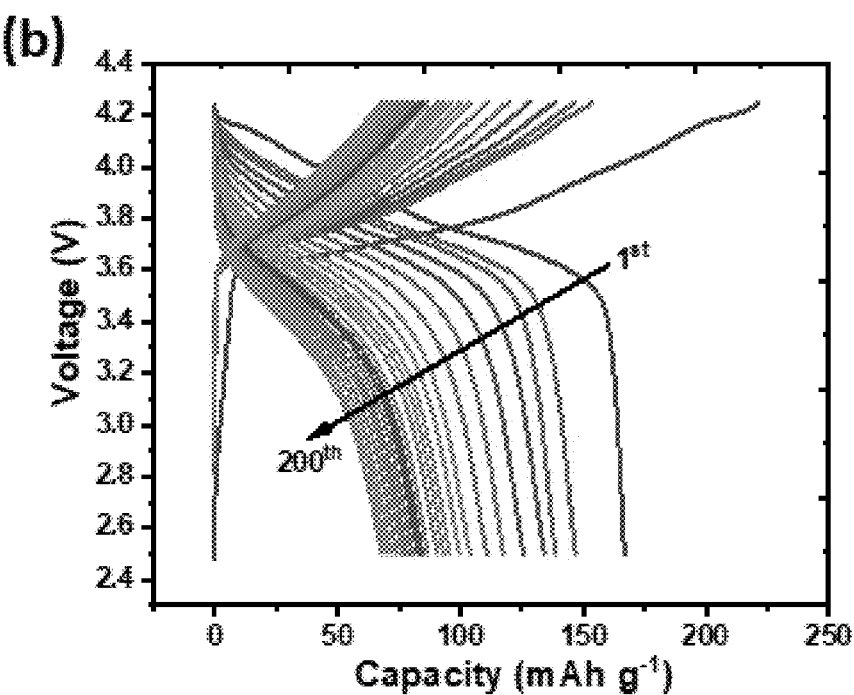
FIG. 7B and FIG. 7D show charge-discharge profiles of NCM811|LPSCl|Li and NCM811|LPSCl+3M1P|Li, respectively.
Figure 7C:
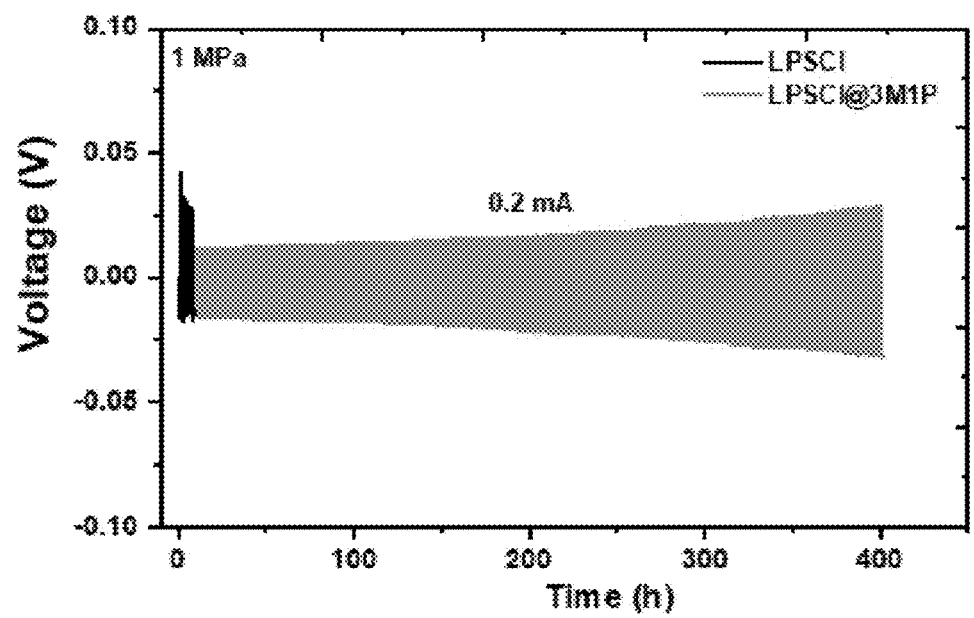
Figure 7D:
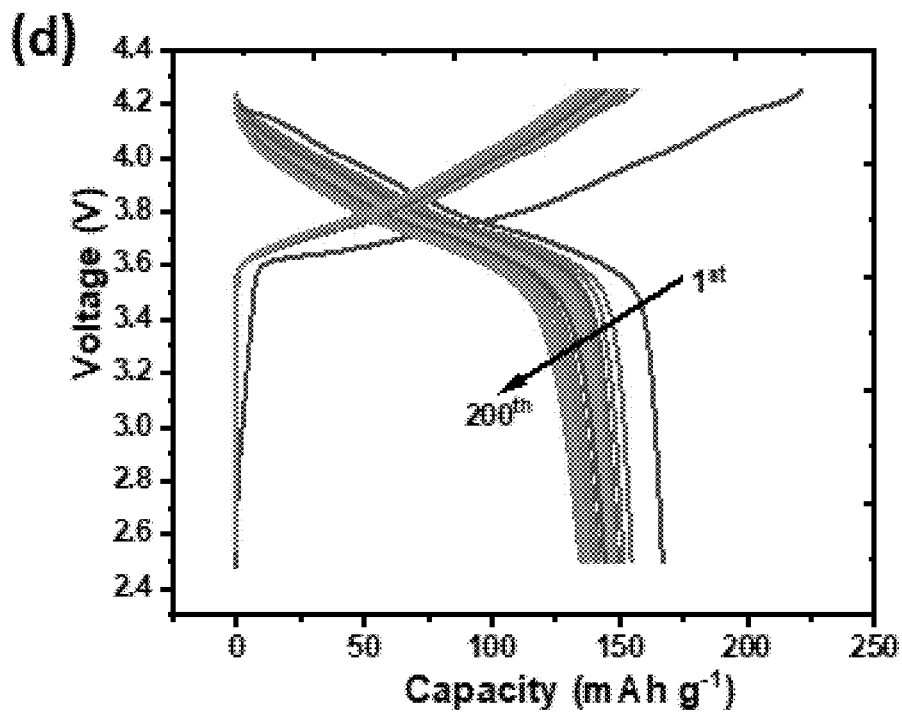

FIG. 7A and FIG. 7C show long term cycling stability of LPSCl and LPSCl+3M1P, respectively, in symmetric cells at various stack pressures and current densities. FIG. 7B and FIG. 7D show charge-discharge profiles of NCM811|LPSCl|Li and NCM811|LPSCl+3M1P|Li, respectively.

The long-term cycle performance of symmetric cells and full cells at various stack pressures and current densities for both electrolytes is shown in FIG. 4a, b. LPSCl+3M1P ASSB exhibits excellent long-term cycle stability (FIG. 4c) under stack pressure of 1 MPa in symmetric cells and a much higher capacity retention of 84% after 200 cycles (FIG. 4d) than that of LPSC in full cells.

It will be understood by those of ordinary skill in the art that aspects of the present disclosure can be performed within a wide equivalent range of parameters without affecting the scope of the disclosure described herein. All publications, patent applications and patents disclosed herein are incorporated by reference in their entirety.

What is claimed is:

1. A solid electrolyte composition comprising:
a sulfide-containing solid electrolyte material, having a surface; and
an organic coating, wherein the organic coating is formed on the surface of the sulfide-containing solid-state electrolyte material, and
wherein the coating is formed from at least one compound of Chemical Formula 1 and the sulfide-containing solid-state electrolyte material:

    A—R—W              Chemical Formula 1 wherein:
A is a halogen;
R is a substituted or unsubstituted C3-C20 alkylene group; and
W is a sulfonate, a phosphonate, or a salt thereof.

2. The solid electrolyte composition according to claim 1, wherein the compound of Chemical Formula 1 is attached to the surface of the sulfide-containing solid-state electrolyte material by chemisorption, van der Waals interaction, or ionic interaction.

3. The solid electrolyte composition according to claim 1, wherein the compound of Chemical Formula 1 reacts with the sulfide-containing solid-state electrolyte material to form a covalent bond.

4. The solid electrolyte composition according to claim 1, wherein in the compound of Chemical Formula 1, A is fluoride, chloride, bromide, or iodide.

5. The solid electrolyte composition according to claim 1, wherein in the compound of Chemical Formula 1, R is a C6-C16 alkylene group.

6. The solid electrolyte composition according to claim 1, wherein the compound of Chemical Formula 1 has a total of 6 to 16 carbons.

7. The solid electrolyte composition according to claim 1, wherein in the compound of Chemical Formula 1, at least one of R is a substituted C3-C20 alkylene group, wherein there are one or more substituents selected from fluorine, chlorine, bromine, ester or ketone moieties.

8. The solid electrolyte composition according to claim 1, wherein the compound of Chemical Formula 1 is 3-chloro-1-propanesulfonic acid or a salt thereof.

9. The solid electrolyte composition according to claim 1, wherein the sulfide-containing solid electrolyte material is selected from the group consisting of an inorganic-based electrolyte material and an organic-based electrolyte material.

10. The solid electrolyte composition according to claim 1, wherein the sulfide-containing solid electrolyte comprises at least one selected from $Li_3P_7S_{11}$, $Li_{10}GeP_2Si_2$, and $Na_3PS_4$ and/or $Li_6PS_5Cl$.

11. The solid electrolyte composition according to claim 1, wherein the sulfide-containing solid electrolyte comprises at least one selected from LPS-based glass or glass ceramic of formula $xLi_2S \cdot yP_2S_5$, wherein x+y=1.

12. The solid electrolyte composition according to claim 1, wherein the sulfide-containing solid electrolyte comprises an argyrodite-based solid electrolyte of formula $Li_6PS_5X$, wherein X is Cl, Br, or I.

13. The solid electrolyte composition according to claim 1, wherein the sulfide-containing solid electrolyte comprises an argyrodite-based solid electrolyte of formula $Li_{6-y}PS_{5-y}Cl_{1+y}$, where y is <1.

14. A method for making a solid electrolyte, comprising:
providing a sulfide-containing solid electrolyte material;
reacting the solid electrolyte material with at least one compound of Chemical Formula 1 to form a coated sulfide-containing solid electrolyte material; and
using the coated sulfide-containing solid electrolyte material to form a solid electrolyte:

$$A\text{—}R\text{—}W \qquad \text{Chemical Formula 1}$$

wherein:
A is a halogen;
R is a substituted or unsubstituted C3-C20 alkylene group; and
W is a sulfonate, a phosphonate, or a salt thereof.

15. An all-solid-state battery comprising:
a negative electrode,
a positive electrode; and
a solid electrolyte comprising the solid electrolyte composition according to claim 1, wherein the solid electrolyte is interposed between the negative electrode and the positive electrode.

16. The all-solid-state battery according to claim 15, wherein the negative electrode comprises lithium crystals in a hexagonal close-packed (HCP) structure.

17. The all-solid-state battery according to claim 15, wherein the deposited lithium crystals are oriented with their (0001) facet parallel to the substrate.

18. An all-solid state lithium metal battery comprising:
a negative electrode comprising lithium,
a positive electrode;
a solid electrolyte composition interposed between the negative electrode and the positive electrode,
wherein the negative electrode comprises lithium crystals in a hexagonal close-packed (HCP) structure;
wherein the solid electrolyte composition comprises:
a sulfide-containing solid electrolyte material; and
an organic coating, wherein the organic coating is formed on the surface of the sulfide-containing solid-state electrolyte material, and
wherein the coating is formed from at least one compound of Chemical Formula 1 and the sulfide-containing solid-state electrolyte material:

$$A\text{—}R\text{—}W \qquad \text{Chemical Formula 1}$$

wherein:
A is a halogen, a SH group, a triethoxysilyl group or a trimethoxysilyl group;
R is a substituted or unsubstituted C3-C20 alkylene group; and
W is a sulfonate, a phosphonate, or a salt thereof.

19. An electric vehicle comprising the all-solid-state battery according to claim 18.

20. An electric vehicle according to claim 19, wherein the electric vehicle is selected from an electric vehicle (EV), a hybrid electric vehicle (HEV), a plug-in hybrid electric vehicle (PHEV), an electric motorcycle, an electric bike (E-bike), an electric scooter (E-scooter) or an electric golf cart.

* * * * *